United States Patent
Chen et al.

(10) Patent No.: US 10,785,800 B2
(45) Date of Patent: Sep. 22, 2020

(54) SYSTEMS AND METHODS FOR DYNAMICALLY SELECTING ENERGY DETECTION THRESHOLDS (EDTS) IN RADIO NODES DEPLOYING LISTEN BEFORE TALK WITHIN A COORDINATED NETWORK TO IMPROVE THROUGHPUT ON SHARED SPECTRUM

(71) Applicant: Corning Optical Communications LLC, Hickory, NC (US)

(72) Inventors: Tsung-Yi Chen, San Jose, CA (US); Hithesh Nama, Los Altos, CA (US); Jiadong Wang, San Diego, CA (US)

(73) Assignee: Corning Optical Communications LLC, Charlotte, NC (US)

( * ) Notice: Subject to any disclaimer, the term of this patent is extended or adjusted under 35 U.S.C. 154(b) by 0 days.

(21) Appl. No.: 16/201,173

(22) Filed: Nov. 27, 2018

(65) Prior Publication Data

US 2019/0098665 A1    Mar. 28, 2019

Related U.S. Application Data

(63) Continuation of application No. PCT/US2018/035705, filed on Jun. 1, 2018.
(Continued)

(51) Int. Cl.
*H04W 4/00*       (2018.01)
*H04W 74/08*      (2009.01)
(Continued)

(52) U.S. Cl.
CPC ...... *H04W 74/0816* (2013.01); *H04B 17/318* (2015.01); *H04B 17/336* (2015.01);
(Continued)

(58) Field of Classification Search
None
See application file for complete search history.

(56) References Cited

U.S. PATENT DOCUMENTS

2007/0286122 A1   12/2007  Fonseca
2013/0017794 A1*   1/2013  Kloper ............ H04W 74/0808
                                                    455/63.1
(Continued)

FOREIGN PATENT DOCUMENTS

WO     2017026981 A1    2/2017

OTHER PUBLICATIONS

Laufer et al; "The Capacity of Wireless CSMA/GA Networks"; IEEE/ACM Transactions on Networking; vol. 24, No. 3, Jun. 2016; pp. 1518-1532.
International Search Report and Written Opinion of the International Searching Aurthority; PCT/US2018/035705; dated Aug. 27, 2018; 15 Pages; European Patent Office.

*Primary Examiner* — Clemence S Han
(74) *Attorney, Agent, or Firm* — C. Keith Montgomery

(57) ABSTRACT

Systems and methods for dynamically selecting energy detection thresholds (EDTs) in radio nodes deploying listen before talk within a coordinated network to improve throughput on shared spectrum are disclosed. The radio nodes are configured to coordinate to deploy mechanisms to avoid or reduce interference issues, including collisions, with use of shared spectrum (e.g., unlicensed spectrum). One such mechanism is Listen Before Talk (LBT), and a radio node deploying LBT sets an EDT at which the radio node hears traffic from neighboring radio nodes on the shared spectrum. In an exemplary aspect, the EDT of radio nodes in the coordinated network of radio nodes can be dynamically selected and/or adjusted to improve throughput of the individual radio nodes and/or of the network of radio nodes as a whole.

19 Claims, 10 Drawing Sheets

Related U.S. Application Data

(60) Provisional application No. 62/516,269, filed on Jun. 7, 2017.

(51) Int. Cl.

| | | |
|---|---|---|
| *H04L 12/26* | (2006.01) | |
| *H04B 17/318* | (2015.01) | |
| *H04B 17/336* | (2015.01) | |
| *H04L 1/00* | (2006.01) | |
| *H04W 16/14* | (2009.01) | |
| *H04W 24/10* | (2009.01) | |
| *H04W 28/18* | (2009.01) | |

(52) U.S. Cl.
CPC ........ *H04L 1/0003* (2013.01); *H04L 43/0888* (2013.01); *H04W 16/14* (2013.01); *H04W 24/10* (2013.01); *H04W 74/0808* (2013.01); *H04W 74/0825* (2013.01); *H04W 28/18* (2013.01)

(56) References Cited

U.S. PATENT DOCUMENTS

| | | |
|---|---|---|
| 2014/0348004 A1 | 11/2014 | Ponnuswamy |
| 2014/0376453 A1* | 12/2014 | Smith ............... H04W 74/0816 370/328 |
| 2016/0112969 A1 | 4/2016 | Zhou et al. |
| 2016/0227489 A1* | 8/2016 | Oteri .................. H04W 52/243 |
| 2017/0134975 A1* | 5/2017 | Huang ................. H04W 24/08 |
| 2017/0280460 A1 | 9/2017 | Emmanuel et al. |
| 2018/0014328 A1* | 1/2018 | Subramani ........ H04W 74/0808 |
| 2018/0110073 A1* | 4/2018 | Mestanov ........... H04W 74/006 |
| 2018/0176890 A1* | 6/2018 | Moon .................. H04L 1/1893 |
| 2018/0242222 A1 | 8/2018 | Shinohara et al. |
| 2018/0288705 A1 | 10/2018 | Park et al. |
| 2018/0317258 A1 | 11/2018 | Wu |
| 2019/0098666 A1* | 3/2019 | Chen .................. H04L 43/0888 |
| 2019/0110297 A1* | 4/2019 | Hedayat ............... H04W 74/02 |
| 2019/0174435 A1* | 6/2019 | Tayamon ........... H04W 52/146 |
| 2019/0320466 A1* | 10/2019 | Mestanov ......... H04W 74/0808 |

\* cited by examiner

SYSTEMS AND METHODS FOR DYNAMICALLY SELECTING ENERGY DETECTION THRESHOLDS (EDTS) IN RADIO NODES DEPLOYING LISTEN BEFORE TALK WITHIN A COORDINATED NETWORK TO IMPROVE THROUGHPUT ON SHARED SPECTRUM

CROSS-REFERENCE TO RELATED APPLICATIONS

This application is a continuation of International Application No. PCT/US18/35705, filed Jun. 1, 2018, which claims priority under 35 U.S.C. § 119(e) to U.S. Provisional Patent Application Ser. No. 62/516,269 entitled "INTELLIGENT SPATIAL REUSE OF LTE-LAA SYSTEMS" and filed on Jun. 7, 2017, which is incorporated herein by reference in its entirety.

BACKGROUND

The disclosure relates generally to wireless communications systems and related networks, such as Universal Mobile Telecommunications Systems (UMTSs), its offspring Long Term Evolution (LTE) and $5^{th}$ Generation New Radio (5G-NR) described and being developed by the Third Generation Partnership Project (3GPP), and more particularly to dynamically selecting energy detection thresholds (EDTs) in radio nodes deploying listen before talk within a coordinated network to improve throughput on shared spectrum.

Operators of mobile systems, such as UMTS and its offspring including LTE and LTE-Advanced, are increasingly relying on wireless macrocell radio access networks (RANs) (e.g., traditional cellular base stations), along with wireless small cell RANs in order to deploy, for example, indoor voice and data services to enterprises and other customers. Such small cell RANs typically utilize multiple-access technologies capable of supporting communications with multiple users using radio frequency (RF) signals and sharing available system resources such as bandwidth and transmit power. Evolved universal terrestrial radio access (E-UTRA) is the radio interface of 3GPP's LTE upgrade path for UMTS mobile networks. In these systems, there are different frequencies where LTE (or E-UTRA) can be used, and in such systems, user mobile communications devices connect to a serving system, which is represented by a cell.

For both macrocell RANs and small cell RANs, increasing demands for wireless throughput make access to additional wireless spectrum desirable. Examples of such additional wireless spectrum include unlicensed spectrum, shared spectrum, spectrum licensed from a third party, spectrum associated with citizens broadband radio service (CBRS), and so on. In these cases, spectrum allocation, or channel allocation, may be performed by a technique or procedures that occur independently or semi-independently of a mobile network operator (MNO), such as by a spectrum access system (SAS) for example. In this regard, radio nodes within the RANs may operate in the same wireless channel with neighboring radio nodes, which can result in collisions, or instances in which the neighboring radio nodes communicate at a same time, causing interference which impairs wireless communications.

Due to the desire by communications service providers to use shared spectrum, such as unlicensed spectrum, to gain additional bandwidth, potentially without additional licensing costs, mechanisms have been designed and implemented to avoid or reduce interference issues, including collisions, with use of shared spectrum. One such mechanism is "Listen Before Talk (LBT)." LBT is a mechanism proposed by the 3GPP for LTE in Unlicensed spectrum (LTE-U) and/or License Assisted Access (LAA) for minimizing interferences between two transceivers operating in the same shared channel(s) (e.g., unlicensed channel(s)). In this regard, a transceiver can start signal transmission of a communications signal in a shared channel after verifying that the shared channel is free for use, meaning that another transceiver is not presently transmitting signals in the same shared channel. Before transmission, the transceiver first listens to the activity "on the air" (i.e., on the shared channel where it intends to transmit), or verifies that the shared channel is not occupied by another transmission. If a transmission in the same shared channel is detected, the transmitter postpones its intended transmission until the shared channel is free. When two transceivers coordinate their activity through use of LBT, each transceiver will have a certain likelihood of finding transmission opportunities where a shared channel is free for transmission signals. Radio nodes incorporating LBT set an energy detection threshold (EDT) at which the radio node "hears" traffic on the shared channel. In other words, if the radio node detects wireless signals at an energy level which exceeds the EDT, the channel is determined to be occupied and the radio node waits before communicating over the channel.

In this regard, FIG. 1 illustrates two neighboring radio nodes 100(1) and 100(2) having different EDTs. A first radio node 100(1) has a higher EDT, such that it will only "hear" (e.g., respond to) radio signals which exceed a defined high EDT, represented here as a relatively small listening range 102(1). A second radio node 100(2) has a lower EDT than the first radio node 100(1), such that the second radio node 100(2) will hear radio signals exceeding a defined low EDT, represented here as a relatively large listening range 102(2). The listening range 102(1) of the first radio node 100(1) indicates that the first radio node 100(1) only hears signals which originate within the listening range due to its higher EDT. Accordingly, because of the higher EDT, the first radio node 100(1) does not hear signals from the second radio node 100(2), and while employing LBT the first radio node 100(1) will transmit signals even if the second radio node 100(2) is transmitting over the same channel. However, the listening range 102(2) of the second radio node 100(2) indicates that due to its lower EDT, the second radio node 100(2) hears signals from the second radio node 100(2), and while employing LBT the second radio node 100(2) will not transmit signals if the first radio node 100(1) is transmitting over the same channel.

In this manner, the second radio node 100(2) having a lower EDT can ensure that the second radio node 100(2) does not transmit when its transmissions might interfere with the first radio node 100(1) (e.g., a neighboring radio node), which can improve signal quality while reducing the amount of time the second radio node 100(2) occupies the shared channel. In contrast, a higher EDT can enable the first radio node 100(1) to occupy the same channel as the second radio node 100(2) (e.g., a neighboring radio node), increasing the amount of time the first radio node 100(1) occupies the channel while decreasing signal quality. Standards, such as LTE-U or LAA, may set a limit to the EDT (e.g., a maximum EDT value), but may otherwise allow radio nodes operating within the standard to set lower EDT values.

No admission is made that any reference cited herein constitutes prior art. Applicant expressly reserves the right to challenge the accuracy and pertinency of any cited documents.

SUMMARY

Embodiments of the disclosure relate to systems and methods for dynamically selecting energy detection thresholds (EDTs) in radio nodes deploying listen before talk within a coordinated network to improve throughput on shared spectrum. As an example, the radio nodes may be within a distributed communications network, such as a macrocell radio access network (RAN) (e.g., a traditional cellular base station) and/or a small cell RAN (e.g., a RAN deployed in an enterprise environment). Each radio node may support wireless communication over unlicensed spectrum, shared spectrum, spectrum licensed from a third party, or other spectrum in which access is arbitrated by an external service not under the control of the operator of the radio node. Radio nodes within the network of radio nodes (e.g., within a RAN) may operate in the same wireless channel with neighboring radio nodes within or without the network of radio nodes, which can result in collisions, or instances in which the neighboring radio nodes communicate at a same time, causing interference which impairs wireless communications. The radio nodes in aspects disclosed herein are configured to coordinate to deploy mechanisms to avoid or reduce interference issues, including collisions, with use of the shared spectrum (e.g., unlicensed spectrum). One such mechanism is "Listen Before Talk (LBT)," as proposed by the Third Generation Partnership Project (3GPP) for LTE in Unlicensed spectrum (LTE-U) and License Assisted Access (LAA) for minimizing interferences between two transceivers (e.g., radio nodes) operating in the same shared channel(s) (e.g., unlicensed channel(s)). A radio node deploying LBT sets an EDT at which the radio node "hears" traffic from neighboring radio nodes on the shared channel. In other words, if a given radio node detects wireless signals at an energy level exceeding its configured or selected EDT, the channel is determined to be occupied and the radio node waits before communicating over the channel. If the given radio node is configured with a lower EDT, LBT can improve signal quality but also reduce the amount of time the given radio node occupies the shared channel. In contrast, if the given radio node is configured with a higher EDT it can occupy the same channel as a neighboring radio node, increasing the amount of time the given radio node occupies the channel while decreasing signal quality. If the given radio node has a fixed EDT or is otherwise unable to dynamically select and adjust its EDT, a higher or lower EDT may result in reduced throughput under changing conditions.

Thus, in exemplary aspects disclosed herein, the EDT of radio nodes in a coordinated network of radio nodes can be dynamically selected and/or adjusted to improve throughput of the individual radio nodes and/or of the network of radio nodes as a whole. In this regard, in one example a network of radio nodes can be logically decomposed into multiple radio node pairs, with the radio nodes in each radio node pair coordinating selection and/or adjustment of EDTs to improve throughput. For each radio node pair, a throughput is calculated for each of multiple EDTs at which the radio nodes in the radio node pair can be set, based on signal, noise, and interference measurements. In some examples, one of the EDTs is based on an EDT limit under LAA or another standard, while the other EDTs are below the EDT limit. The EDT which is calculated to result in a higher throughput is selected for the radio node pair. If a radio node is within multiple radio node pairs and receives more than one EDT selection, a voting algorithm can be applied to determine the operating EDT of the radio node (e.g., the lower of the EDTs, or an EDT which learning algorithms indicate would result in a higher throughput of the network of radio nodes).

In one exemplary aspect, a method of selecting EDTs in a network of radio nodes deploying listen before talk is provided. The method includes identifying at least one of a plurality of radio node pairs in the network of radio nodes. The method also includes, for each of the identified at least one of the plurality of radio node pairs, calculating a first throughput for a respective radio node pair operating on a first EDT as a function of a signal-to-interference-plus noise ratio (SINR) and calculating a second throughput for the respective radio node pair operating on a second EDT, lower than the first EDT, as a function of a signal-to-noise ratio (SNR). The method also includes, for each of the identified at least one of the plurality of radio node pairs, selecting an EDT for the respective radio node pair to be the first EDT when the first throughput is higher than the second throughput, and selecting the EDT for the respective radio node pair to be the second EDT when the second throughput is higher than the first throughput.

An additional embodiment of the disclosure relates to a method of selecting an EDT for a first radio node deploying listen before talk. The method includes determining a first radio node pair between the first radio node and a second radio node and detecting a first signal parameter, a first interference parameter, and a first noise parameter associated with the first radio node. The method also includes calculating a first throughput for the first radio node operating on a first EDT as a first function of a first SINR based on the first signal parameter, the first interference parameter, and the first noise parameter. The method also includes calculating a second throughput for the first radio node operating on a second EDT, lower than the first EDT, as a second function of a first SNR based on the first signal parameter and the first noise parameter. The method also includes setting an operating EDT for the first radio node to be the first EDT when the first throughput is higher than the second throughput, and setting the operating EDT for the first radio node to be the second EDT when the second throughput is higher than the first throughput.

An additional embodiment of the disclosure relates to a controller circuit for selecting an EDT for a first radio node deploying listen before talk. The controller circuit includes a communication interface circuit configured to receive communications from a second radio node and a processor circuit. The processor circuit is configured to identify a first radio node pair between the first radio node and the second radio node. The processor circuit is also configured to calculate a first throughput for the first radio node pair operating on a first EDT, as a first function of a first SINR and based on the communications received from the second radio node. The processor circuit is also configured to calculate a second throughput for the first radio node pair operating on a second EDT, lower than the first EDT, as a second function of a first SNR and based on the communications received from the second radio node. The processor circuit is also configured to select an EDT for the first radio node pair to be the first EDT when the first throughput is higher than the second throughput and select the EDT for the first radio node pair to be the second EDT when the second throughput is higher than the first throughput.

Additional features and advantages will be set forth in the detailed description which follows and, in part, will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding of the disclosure, and are incorporated in and constitute a part of this specification. The drawings illustrate one or more embodiment(s), and together with the description serve to explain principles and operation of the various embodiments.

DETAILED DESCRIPTION

Figure 1:
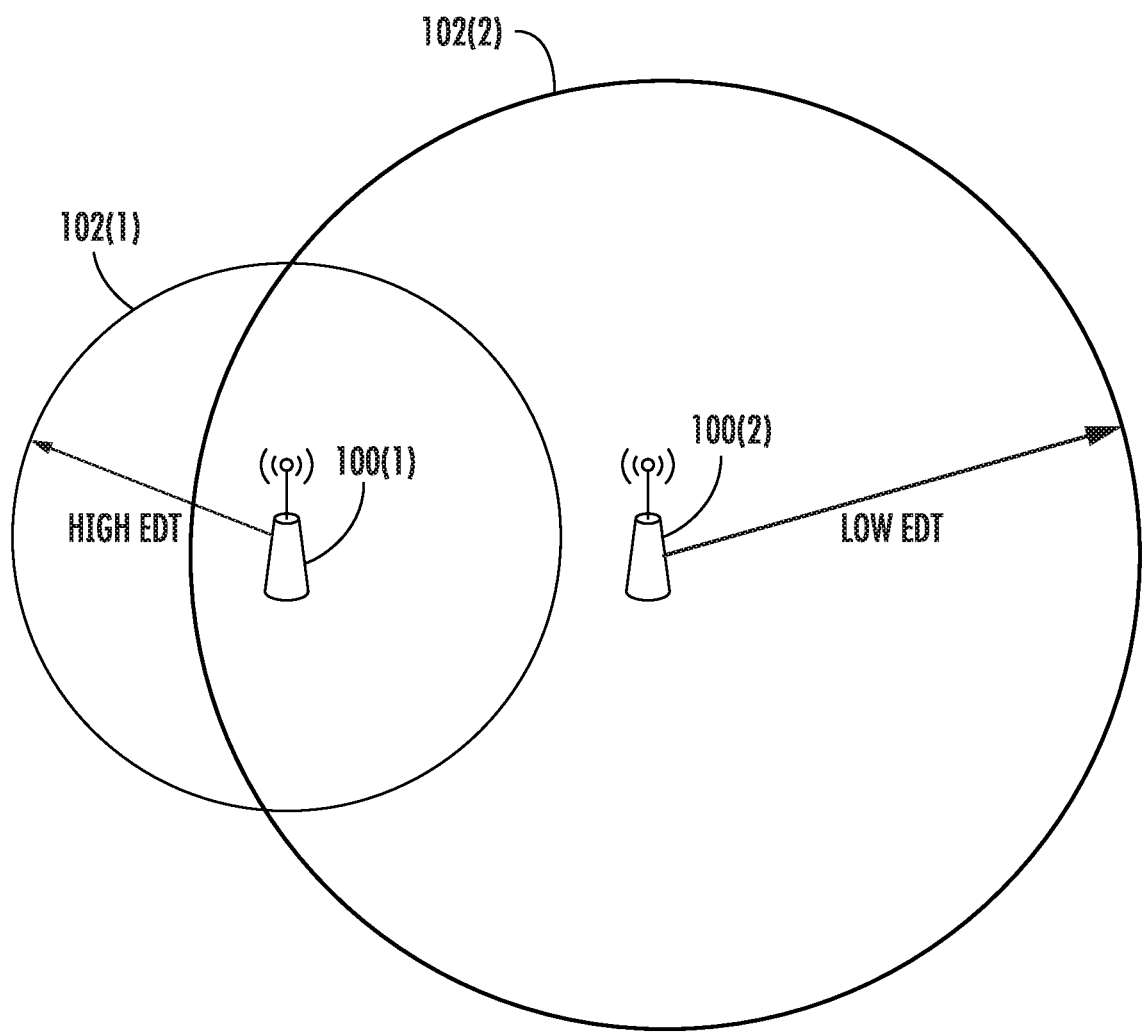
FIG. 1 illustrates two neighboring radio nodes having different energy detection thresholds (EDTs)

Embodiments of the disclosure relate to systems and methods for dynamically selecting energy detection thresholds (EDTs) in radio nodes deploying listen before talk within a coordinated network to improve throughput on shared spectrum. As an example, the radio nodes may be within a distributed communications network, such as a macrocell radio access network (RAN) (e.g., a traditional cellular base station) and/or a small cell RAN (e.g., a RAN deployed in an enterprise environment). Each radio node may support wireless communication over unlicensed spectrum, shared spectrum, spectrum licensed from a third party, or other spectrum in which access is arbitrated by an external service not under the control of the operator of the radio node. Radio nodes within the network of radio nodes (e.g., within a RAN) may operate in the same wireless channel with neighboring radio nodes within or without the network of radio nodes, which can result in collisions, or instances in which the neighboring radio nodes communicate at a same time, causing interference which impairs wireless communications. The radio nodes in aspects disclosed herein are configured to coordinate to deploy mechanisms to avoid or reduce interference issues, including collisions, with use of the shared spectrum (e.g., unlicensed spectrum). One such mechanism is "Listen Before Talk (LBT)," as proposed by the Third Generation Partnership Project (3GPP) for LTE in Unlicensed spectrum (LTE-U) and License Assisted Access (LAA) for minimizing interferences between two transceivers (e.g., radio nodes) operating in the same shared channel(s) (e.g., unlicensed channel(s)). A radio node deploying LBT sets an EDT at which the radio node "hears" traffic from neighboring radio nodes on the shared channel. In other words, if a given radio node detects wireless signals at an energy level which exceeds its configured or selected EDT, the channel is determined to be occupied and the radio node waits before communicating over the channel. If the given radio node is configured with a lower EDT, LBT can improve signal quality but also reduce the amount of time the given radio node occupies the shared channel. In contrast, if the given radio node is configured with a higher EDT it can occupy the same channel as a neighboring radio node, increasing the amount of time the given radio node occupies the channel while decreasing signal quality. If the given radio node has a fixed EDT or is otherwise unable to dynamically select and adjust its EDT, a higher or lower EDT may result in reduced throughput under changing conditions.

Thus, in exemplary aspects disclosed herein, the EDT of radio nodes in a coordinated network of radio nodes can be dynamically selected and/or adjusted to improve throughput of the individual radio nodes and/or of the network of radio nodes as a whole. In this regard, in one example a network of radio nodes can be logically decomposed into multiple radio node pairs, with the radio nodes in each radio node pair coordinating selection and/or adjustment of EDTs to improve throughput. For each radio node pair, a throughput is calculated for each of multiple EDTs at which the radio nodes in the radio node pair can be set, based on signal, noise, and interference measurements. In some examples, one of the EDTs is based on an EDT limit under LAA or another standard, while the other EDTs are below the EDT limit. The EDT which is calculated to result in a higher throughput is selected for the radio node pair. If a radio node is within multiple radio node pairs and receives more than one EDT selection, a voting algorithm can be applied to determine the operating EDT of the radio node (e.g., the lower of the EDTs, or an EDT which learning algorithms indicate would result in a higher throughput of the network of radio nodes).

Figure 2:
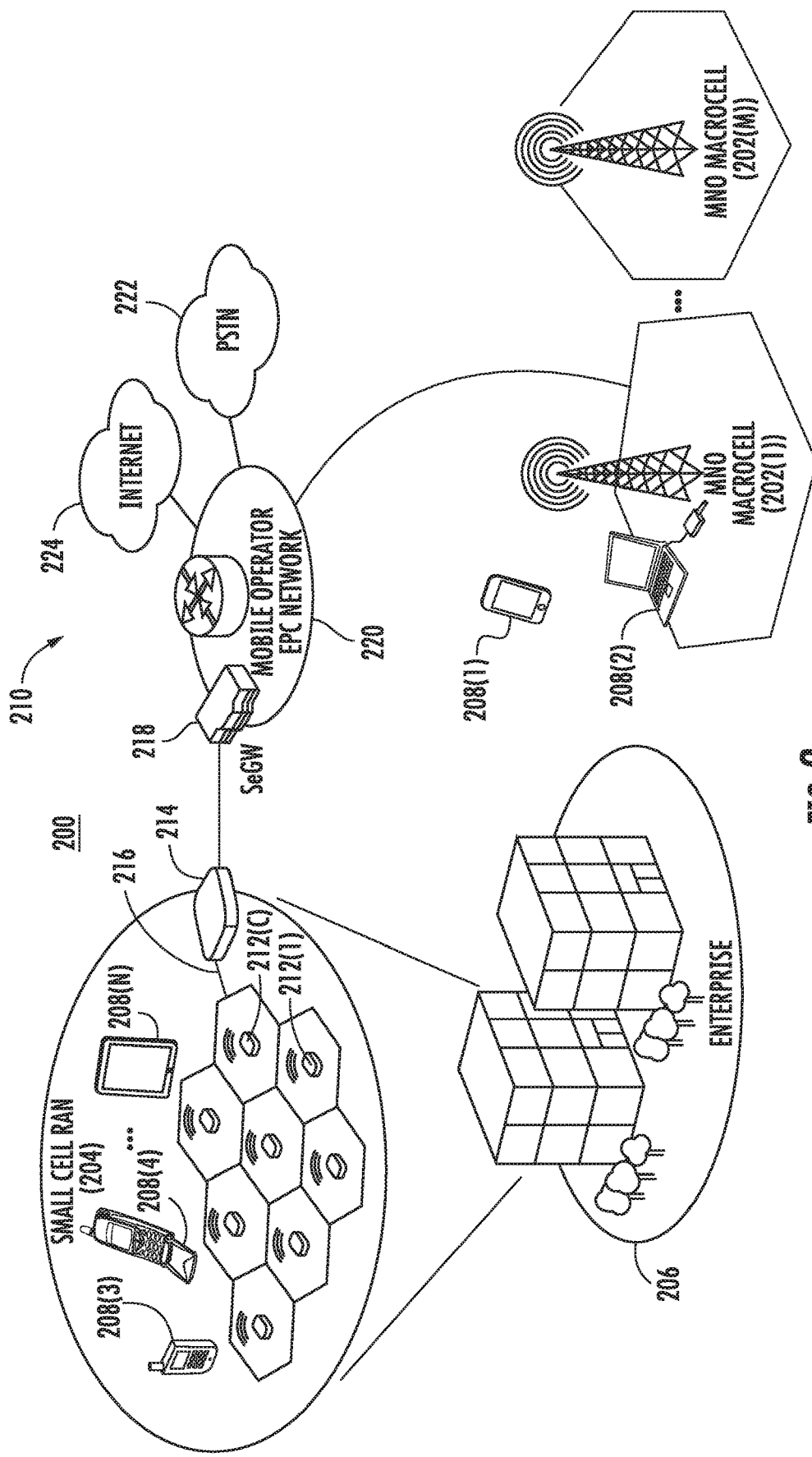
FIG. 2 is a schematic diagram of an exemplary mobile telecommunications environment that includes an exemplary macrocell radio access network (RAN) and an exemplary small cell RAN located within an enterprise environment and configured to service mobile communications between a user mobile communications device to a mobile network operator (MNO), wherein the RANs include radio nodes configured to access a shared radio frequency spectrum and dynamically select EDTs to improve throughput.
Figure 3A:
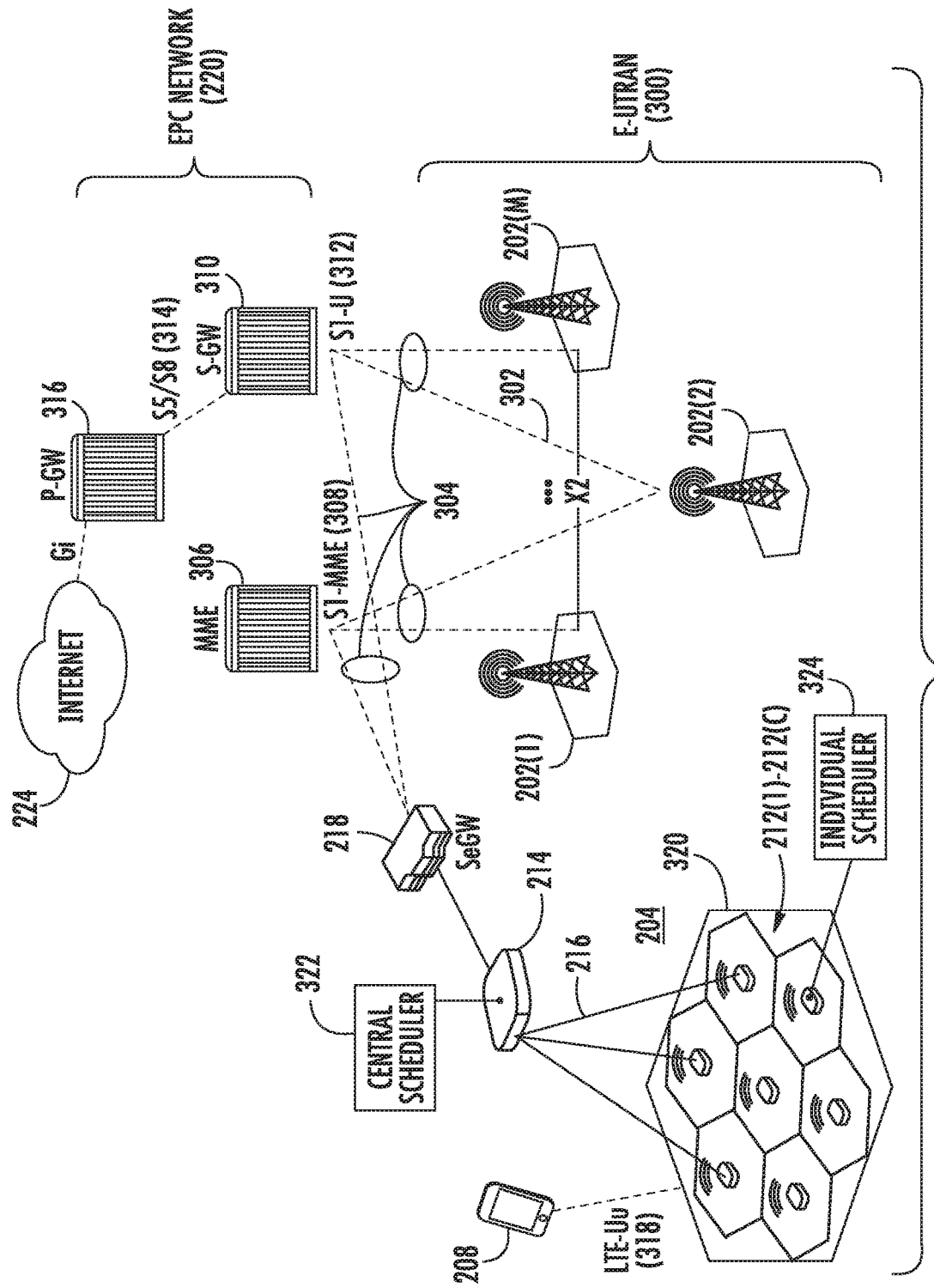
FIGS. 3A and 3B illustrate exemplary details of an evolved packet core (EPC) and Evolved Universal Mobile Telecommunications System (UMTS) Terrestrial Radio Access Network (E-UTRAN) arranged under Long Term Evolution (LTE) for the mobile telecommunications environment in FIG. 2.
Figure 3B:
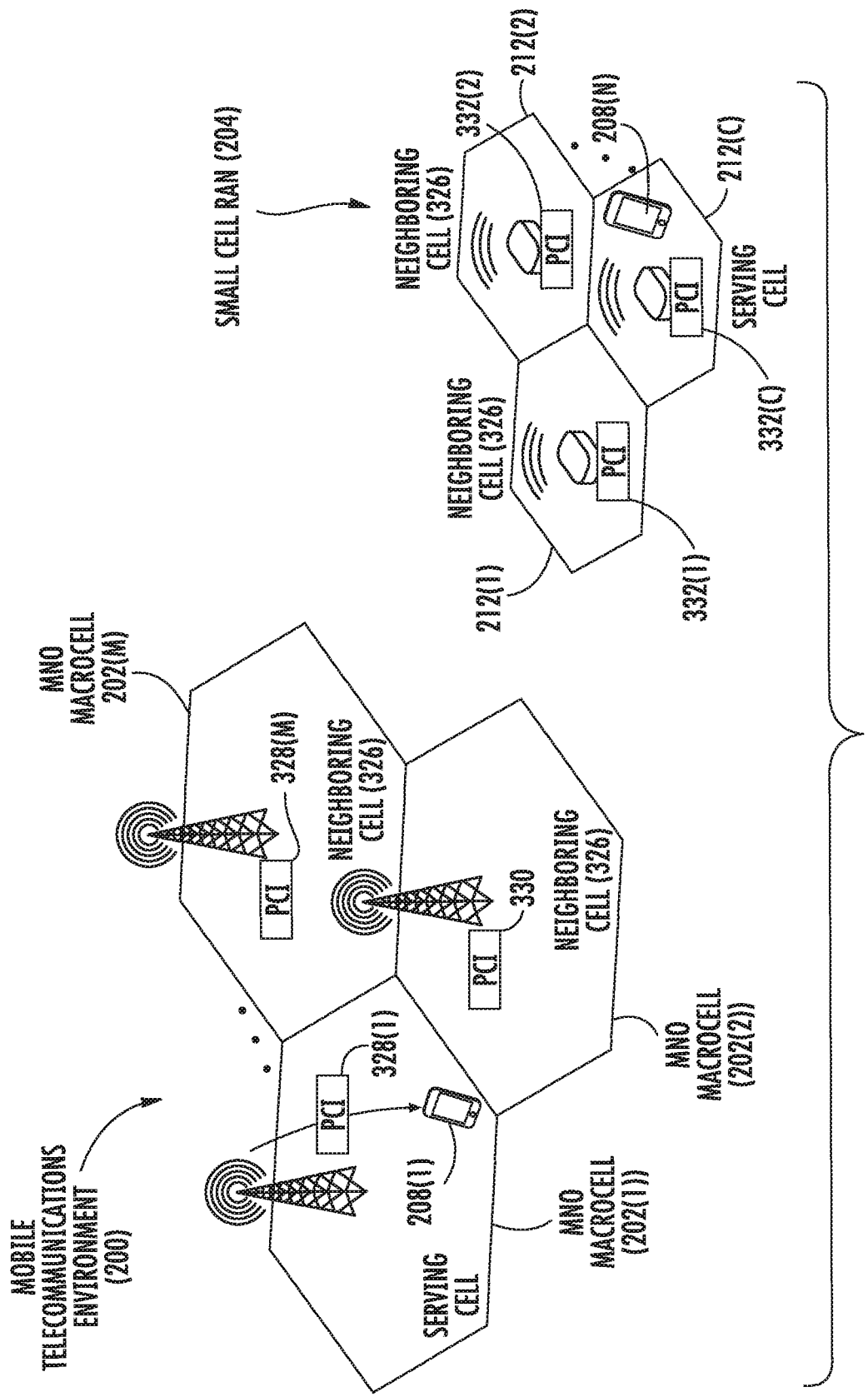

Prior to discussing the above aspects of this disclosure, an exemplary telecommunications environment 200 as depicted in FIGS. 2-3B is described, in which radio nodes deploy listen before talk within a coordinated network to improve throughput on shared spectrum. In this regard, FIG. 2 is a schematic diagram of the exemplary mobile telecommunications environment 200 (also referred to as "environment 200") that includes exemplary macrocell RANs 202(1)-202(M) ("macrocells 202(1)-202(M)") and an exemplary small cell RAN 204 located within an enterprise environment 206 and configured to service mobile communications between a user mobile communications device 208(1)-208(N) to a mobile network operator (MNO) 210. A serving RAN for a user mobile communications device 208(1)-208(N) is a RAN or cell in the RAN in which the user mobile communications device 208(1)-208(N) has an established communications session with the exchange of mobile communications signals for mobile communications. Thus, a serving RAN may also be referred to herein as a serving cell. For example, the user mobile communications devices 208(3)-208(N) in FIG. 2 are being serviced by the small cell RAN 204, whereas user mobile communications devices 208(1), 208(2) are being serviced by the macrocells 202(1)-202(M). The macrocells 202(1)-202(M) are MNO macrocells in this example.

In this regard, with reference to FIG. 2, the mobile telecommunications environment 200 in this example, is arranged as a Long Term Evolution (LTE) system as described by the Third Generation Partnership Project (3GPP) as an evolution of the Global System for Mobile Communication/Universal Mobile Telecommunications System (GSM/UMTS) standards. It is emphasized, however, that the aspects described herein may also be applicable to other network types and protocols. The mobile telecommunications environment 200 includes the enterprise environment 206 in which the small cell RAN 204 is implemented. The small cell RAN 204 includes a plurality of small cell radio nodes 212(1)-212(C). Each small cell radio node 212(1)-212(C) has a radio coverage area (graphically depicted in the drawings as a hexagonal shape) that is commonly termed a "small cell." A small cell may also be referred to as a femtocell, or using terminology defined by 3GPP as a Home Evolved Node B (HeNB). In the description that follows, the term "cell" typically means the combination of a radio node and its radio coverage area unless otherwise indicated.

As discussed above and in more detail below, the EDT of radio nodes (e.g., small cell radio nodes 212(1)-212(C) or macrocells 202(1)-202(M)) can be dynamically selected and/or adjusted to improve throughput of the individual radio nodes and/or of the RAN 202(1)-202(M), 204 as a whole. In this regard, a RAN 202(1)-202(M), 204 can be logically decomposed into multiple radio node pairs (e.g., small cell radio nodes 212(1) and 212(2)). For each radio node pair, a throughput is calculated for each of multiple EDTs at which the radio nodes in the radio node pair can be set, based on signal, noise, and interference measurements. The EDT which is calculated to result in a higher throughput is selected for the radio node pair, as described further below with respect to FIGS. 4-8.

The size of the enterprise environment 206 and the number of cells deployed in the small cell RAN 204 may vary. In typical implementations, the enterprise environment 206 can be from 50,000 to 500,000 square feet and encompass multiple floors, and the small cell RAN 204 may support hundreds to thousands of users using mobile communications platforms such as mobile phones, smartphones, tablet computing devices, and the like shown as the user mobile communications devices 208(3)-208(N). However, the foregoing is intended to be illustrative and the solutions described herein can be typically expected to be readily scalable either upwards or downwards as the needs of a particular usage scenario demand.

In reference to FIG. 2, the small cell RAN 204 includes one or more services nodes (represented as a single services node 214 in FIG. 2) that manage and control the small cell radio nodes 212(1)-212(C). In alternative implementations, the management and control functionality may be incorporated into a small cell radio node 212(1)-212(C), distributed among nodes, or implemented remotely (i.e., using infrastructure external to the small cell RAN 204). The small cell radio nodes 212(1)-212(C) are coupled to the services node 214 over a direct or local area network (LAN) connection 216 as an example, typically using secure IPsec tunnels. The services node 214 aggregates voice and data traffic from the small cell radio nodes 212(1)-212(C) and provides connectivity over an internet protocol security (IPsec) tunnel to a security gateway (SeGW) 218 in an Evolved Packet Core (EPC) 220 network of the MNO 210. The EPC 220 is typically configured to communicate with a public switched telephone network (PSTN) 222 to carry circuit-switched traffic, as well as for communicating with an external packet-switched network such as the Internet 224.

Some or all of the macrocells 202(1)-202(M) can also be an Evolved Node B (eNB) base station. The radio coverage area of a macrocell 202(1)-202(M) is typically much larger than that of a small cell where the extent of coverage often depends on the base station configuration and surrounding geography. Thus, a given user mobile communications device 208(3)-208(N) in the small cell RAN 204 may achieve connectivity to the EPC network 220 through either a macrocell 202(1)-202(M) or small cell radio node 212(1)-212(C) in the small cell RAN 204 in the environment 200.

FIGS. 3A and 3B illustrate exemplary details of an EPC and Evolved UMTS Terrestrial Radio Access Network (E-UTRAN) arranged under LTE for the mobile telecommunications environment 200 in FIG. 2. Along with the macrocells 202(1)-202(M), the small cell RAN 204 forms an access network (i.e., an E-UTRAN) under 3GPP as represented by reference numeral 300 in FIG. 3A. As shown in FIG. 3A, there is no centralized controller in the E-UTRAN 300, hence an LTE network architecture is commonly said to be "flat." Macrocells 202(1)-202(M) are typically interconnected using an X2 interface 302. In some cases, small cell radio nodes 212(1)-212(C) and/or macrocells 202(1)-202(M) may be interconnected with radio nodes in other networks using an X2 interface 302. The macrocells 202(1)-202(M) are also typically connected to the EPC network 220 by means of an S1 interface 304. More particularly, the macrocells 202(1)-202(M) are connected to a Mobility Management Entity (MME) 306 in the EPC network 220 using an S1-MME interface 308, and to a Serving Gateway (S-GW) 310 using an S1-U interface 312. An S5/S8 interface 314 couples the S-GW 310 to a Packet Data Network Gateway (P-GW) 316 in the EPC network 220 to provide the user mobile communications device 208 with connectivity to the Internet 224. A user mobile communications device 208 can connect to the small cell radio nodes 212(1)-212(C) in the small cell RAN 204 over an LTE-Uu interface 318.

The S1-MME interface 308 is also connected to the MME 306 and S-GW 310 in the EPC network 220 using the appropriate S1 interface connections 304. Accordingly, as each of the small cell radio nodes 212(1)-212(C) in the small cell RAN 204 is operatively coupled to the services node 214 over the LAN connection 216, the communications connections from the small cell radio nodes 212(1)-212(C) are aggregated to the EPC network 220. Such aggregation preserves the flat characteristics of the LTE network while reducing the number of S1 interface connections 304 that would otherwise be presented to the EPC network 220. Thus, the small cell RAN 204 essentially appears as a single eNB 320 to the EPC network 220, as shown. The services node 214 in the small cell RAN 204 includes a central scheduler 322. The small cell radio nodes 212(1)-212(C) may also be configured to support individual schedulers 324.

A user mobile communications device 208 connected to the environment 200 will actively or passively monitor a cell in a macrocell 202(1)-202(M) in the E-UTRAN 300 in the communications range of the user mobile communications device 208 as the user mobile communications device 208 moves throughout the environment 200. As shown in FIG. 3B, such a cell is termed the "serving cell." For example, if a user mobile communications device 208(1)-208(N) is in communication through an established communications session with a particular small cell radio node 212(1)-212(C) in the small cell RAN 204, the particular small cell radio node 212(1)-212(C) will be the serving cell to the user mobile communications device 208(1)-208(N), and the small cell RAN 204 will be the serving RAN. The user mobile communications device 208(1)-208(N) will continually evaluate the quality of a serving cell as compared with that of a neighboring cell 326 in the small cell RAN 204 and/or the macrocells 202(1)-202(M), as shown in FIG. 3B. A neighboring cell 326 is a cell among the small cell RAN 204 and/or macrocells 202(1)-202(M), that is not in control of the active communications session for a given user mobile communications device 208(1)-208(N), but is located in proximity to a serving cell to a user mobile communications device 208(1)-208(N) such that the user mobile communications device 208(1)-208(N) could be in communications range of both its serving cell and the neighboring cell 326. Both small cell radio nodes 212(1)-212(C) and the macrocells 202(1)-202(M) can identify themselves to a user mobile communications device 208(1)-208(N) using a respective unique Physical Cell Identity (PCI) 328(1)-328(M), 330, 332(1)-332(C) (e.g., a public land mobile network (PLMN) identification (ID) (PLMN ID)) that is transmitted over a downlink user mobile communications device 208(1)-208(N). Each of the small cell radio nodes 212(1)-212(C) and the macrocells 202(1)-202(M) can assign a physical channel identity (PCI) that allows user mobile communications device 208(1)-208(N) to distinguish adjacent cells. As such, the PCIs 328(1)-328(M), 330, 332(1)-332(C) are uniquely assigned among neighboring cells 326, but can be reused across geographically separated cells.

In this regard, aspects disclosed herein include the ability of radio nodes (e.g., small cell radio nodes 212(1)-212(C) or macrocells 202(1)-202(M)) to coordinate to dynamically select and/or adjust an operating EDT to improve throughput of the radio nodes and/or of the RAN 202(1)-202(M), 204. In an exemplary aspect, one or more of the small cell radio nodes 212(1)-212(C) or radio nodes in the macrocells 202(1)-202(M) (or another network entity, such as the services node 214) can determine a radio node pair with a neighboring radio node, as depicted in FIGS. 4A-6. The throughput of the radio node can be calculated for the radio node pair operating on each of a plurality of EDTs, based on parameters measured by the radio node or received from user mobile communications devices (e.g., signal power, interference power, noise, etc.). The EDT which is calculated to have a higher (e.g., the highest) throughput is selected for the radio node pair, as described with respect to FIGS. 4A-4B and 7-8.

Figure 4B:
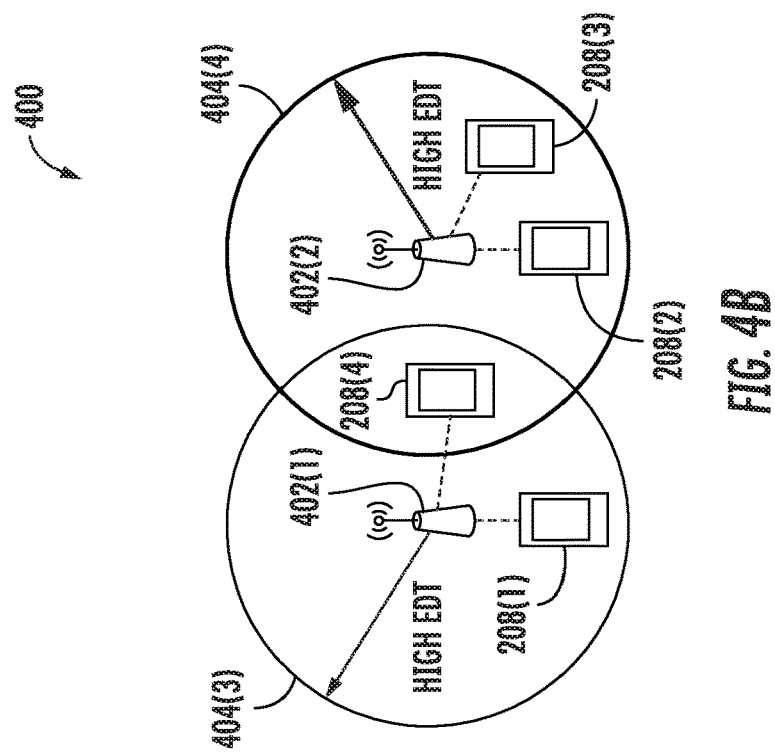
FIG. 4B is a schematic diagram of the exemplary radio node pair of FIG. 4A having a higher operating EDT.
Figure 4A:
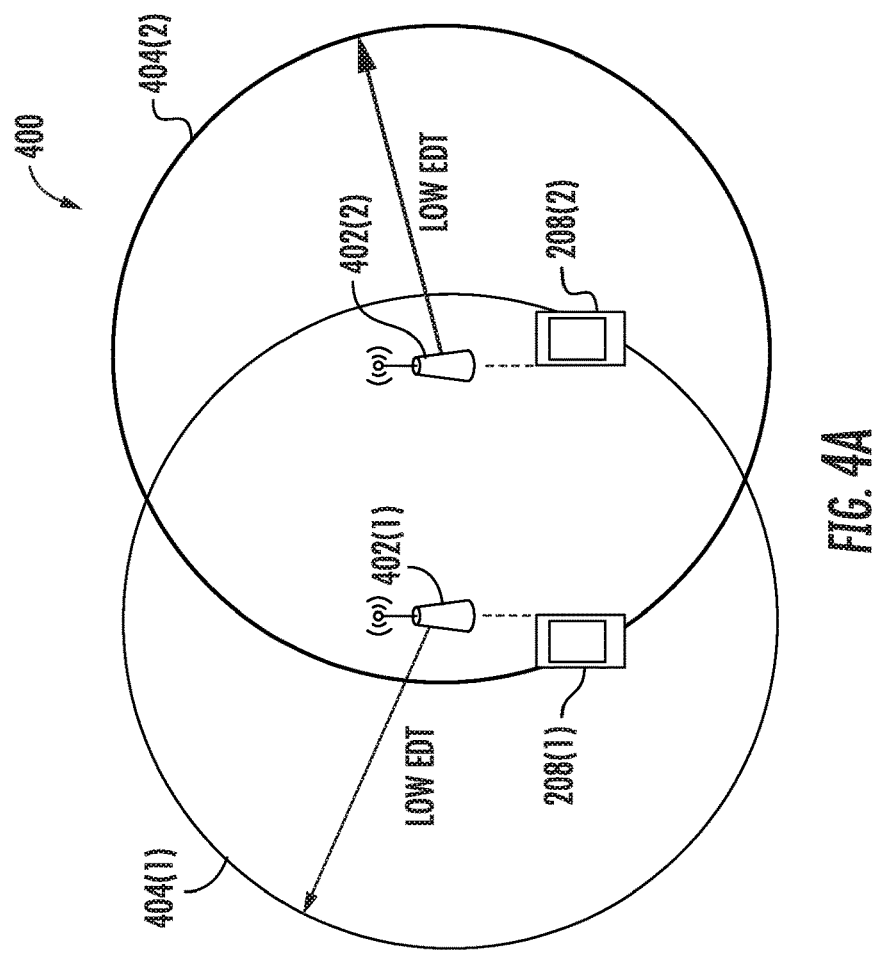
FIG. 4A is a schematic diagram of an exemplary radio node pair configured to deploy telecommunications services from a core network and having a lower operating EDT.

In this regard, with reference to FIGS. 4A and 4B, a radio node pair 400 includes a first radio node 402(1) and a second, neighboring radio node 402(2), which are configured to coordinate their EDTs to improve or maximize throughput. FIG. 4A is a schematic diagram of an exemplary radio node pair 400 configured to deploy telecommunications services from a core network and having a lower operating EDT. FIG. 4B is a schematic diagram of the exemplary radio node pair of FIG. 4A having a higher operating EDT. The first radio node 402(1) and the second radio node 402(2) may be deployed in a coordinated network of radio nodes, such as the small cell RAN 204 or the macrocell RAN 202 depicted in FIGS. 2-3B. The first radio node 402(1) can deploy telecommunications services to a first user mobile communications device 208(1), and the second radio node 402(2) can deploy telecommunications services to a second user mobile communications device 208(2).

Each of the first radio node 402(1) and the second radio node 402(2) can be configured to increase its wireless throughput by accessing additional wireless spectrum to the licensed spectrum of its serving MNO. Examples of such additional wireless spectrum include unlicensed spectrum, shared spectrum, spectrum licensed from a third party, spectrum associated with citizens broadband radio service (CBRS), and so on, referred to herein as shared spectrum. When accessing the shared spectrum, spectrum allocation or channel allocation may be performed by a technique or procedures that occur independently or semi-independently of the MNO (e.g., by a spectrum access system (SAS)). In this regard, the first radio node 402(1) can operate in the same wireless channel (e.g., a shared channel) with the neighboring second radio node 402(2), which can result in collisions, or instances in which the neighboring radio nodes 402(1), 402(2) communicate at a same time, causing interference which impairs wireless communications and/or throughput of the radio node pair 400.

Accordingly, each of the first radio node 402(1) and the second radio node 402(2) (and/or a network device, such as the services node 214 of FIGS. 2-3B) can deploy mechanisms to avoid or reduce interference issues, including collisions, such as LBT. LBT may be deployed in accordance with one or more wireless communications standards, such as LTE-U and/or LAA as proposed by 3GPP. Because the first radio node 402(1) and the second radio node 402(2) deploy LBT, each radio node 402(1), 402(2) sets an EDT at which the radio node "hears" (e.g., responds to) traffic on the shared channel. For example, the first radio node 402(1) hears, or responds to, radio signals from the second radio node 402(2) received at an energy level which exceeds the EDT.

FIG. 4A represents the magnitude of a lower EDT of the first radio node 402(1) through a first large listening range 404(1) and the same lower EDT of the second radio node 402(2) (e.g., a coordinated lower EDT) through a second large listening range 404(2). Accordingly, when the first radio node 402(1) has a defined low EDT, it is more likely to detect radio signals which originate from further away, resulting in the first large listening range 404(1). Because the second radio node 402(2) is within the first large listening range 404(1), the first radio node 402(1) can hear the second radio node 402(2), and will determine that the shared channel is occupied when the second radio node 402(2) is transmitting. Similarly, the second radio node 402(2) can hear the first radio node 402(1), and will determine that the shared channel is occupied when the first radio node 402(1) is transmitting. Due to the deployment of LBT, the first radio node 402(1) and the second radio node 402(2) will not transmit at a same time on a same wireless channel (e.g., the shared channel), which can improve signal quality by reducing collisions or other interference.

In contrast, FIG. 4B depicts the first radio node 402(1) having a higher EDT indicated by a first small listening range 404(3) and the second radio node 402(2) having the same higher EDT (e.g., a coordinated higher EDT) indicated by a second small listening range 404(4). Accordingly, when the first radio node 402(1) has a defined high EDT, it is less likely to detect radio signals which originate from further away, resulting in the first small listening range 404(3). Because the second radio node 402(2) is outside the first small listening range 404(3), the first radio node 402(1) cannot hear the second radio node 402(2) (e.g., does not respond to signals from the second radio node 402(2)), and will determine that the shared channel is available and may transmit when the second radio node 402(2) is transmitting. Similarly, the second radio node 402(2) cannot hear the first radio node 402(1), and will determine that the shared channel is available and may transmit when the first radio node 402(1) is transmitting. Under LBT, the first radio node 402(1) and the second radio node 402(2) may at times transmit at a same time on a same channel (e.g., the shared channel), which can increase channel occupancy, but one or both radio nodes 404(1), 404(2) may experience reduced signal quality due to increased collisions or other interference.

In an exemplary aspect disclosed herein, the radio node pair 400 can be identified and wireless throughput can be calculated for each of multiple EDT magnitudes. In this regard, the optimal operational EDT can depend on a number of factors. As a first non-limiting example, the second radio node 402(2) can be in communication with only a third user mobile communications device 208(3), while the first radio node 402(1) is in communication with only the first user mobile communications device 208(1). Due to the relative positions of the user mobile communications devices 208(1) and 208(3) and the radio nodes 402(1) and 402(2), the second radio node 402(2) and/or the third user mobile communications device 208(3) can experience a lower signal-to-interference-plus-noise ratio (SINR) when the first radio node 402(1) communicates with the first user mobile communications device 208(1). The SINR here can be defined as a power of a signal between the second radio node 402(2) and the third user mobile communications device 208(3) divided by the sum of an interference power from interfering signals between the first radio node 402(1) and the first user mobile communications device 208(1) plus the power of background noise on the wireless channel. The lower SINR may enable the second radio node 402(2) to share a wireless channel while maintaining higher throughput (e.g., due to a higher modulation rate, a lower transmission error rate, and so on). Thus it may improve throughput to set the radio node pair 400 to operate with a higher EDT (resulting in the small listening ranges 404(3), 404(4)).

As a second non-limiting example, the first radio node 402(1) can be in communication with a fourth user mobile communications device 208(4), while the second radio node 402(2) is in communication with the second user mobile communications device 208(2). Due to the relative positions of the user mobile communications devices 208(2) and 208(4) and the radio nodes 402(1) and 402(2), the first radio node 402(1) and/or the fourth user mobile communications device 208(4) can experience a higher SINR when the second radio node 402(2) communicates with the second user mobile communications device 208(2). The higher SINR may cause the first radio node 402(1) to have a reduced throughput (e.g., due to a lower modulation rate, a higher transmission error rate, and so on) when sharing a wireless channel with the second radio node 402(2). Thus it may improve throughput to set the radio node pair 400 to operate with a lower EDT (resulting in the large listening ranges 404(1), 404(2)) to avoid collisions between the first radio node 402(1) and the second radio node 402(2). In this regard, the radio node pair 400 can dynamically set and/or adjust the EDT after calculating an expected throughput for the radio node pair operating on multiple EDTs.

Figure 5:
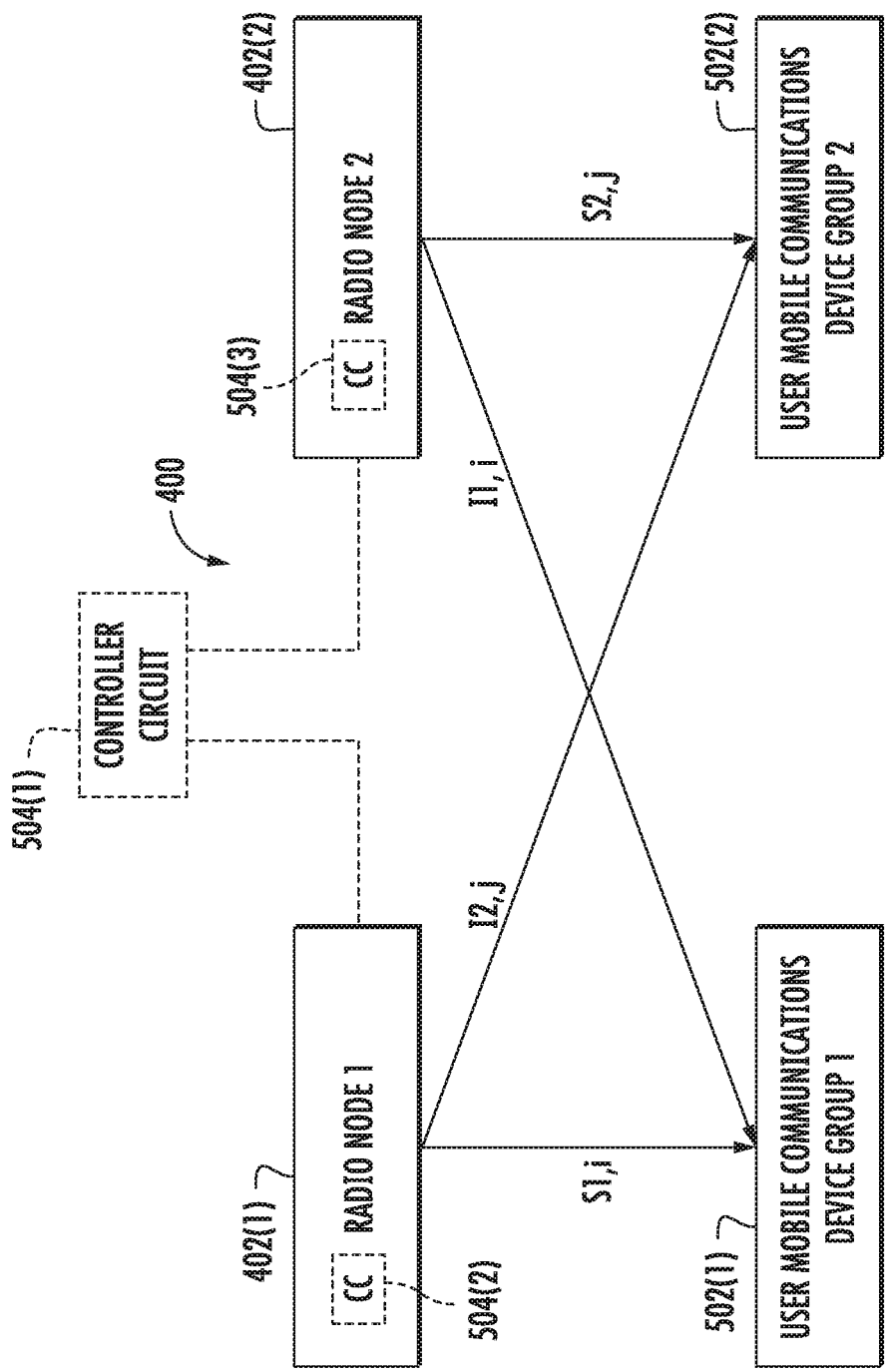
FIG. 5 is a schematic diagram of the exemplary radio node pair of FIG. 4A having a first radio node and a second radio node deploying listen before talk and coordinating to improve throughput on shared spectrum.

FIG. 5 is a schematic diagram of the exemplary radio node pair 400 of FIG. 4A having a first radio node 402(1) and a second radio node 402(2) deploying listen before talk and coordinating to improve throughput on shared spectrum. The first radio node 402(1) and the second radio node 402(2) are radio nodes in a coordinated network of radio nodes, such as the small cell RAN 204 or the macrocell RAN 202 depicted in FIGS. 2-3B. Multiple radio node pairs 400 can be identified in the network in order to facilitate dynamically setting the EDT of the radio node pairs 400 to increase throughput of the network. The identification of radio node pairs 400 is illustrated further in FIG. 6.

The first radio node 402(1) is configured to service mobile communications services between a first user mobile communications device group 502(1) to an MNO, such as the MNO 210 depicted in FIG. 2. As represented in FIG. 5, when the first radio node 402(1) is transmitting, one or more devices in the first user mobile communications device group 502(1) receive signal power S1,i, representing received signal power from the first radio node 402(1) at an $i^{th}$ device in the first user mobile communications device group 502(1). If the second radio node 402(2) is transmitting at a same time, the one or more devices in the first user mobile communications device group 502(1) receive interference power I1,i, representing received interference power from the second radio node 402(2) at the $i^{th}$ device in the first user mobile communications device group 502(1). The received signal power S1,i (e.g., a first signal parameter) and received interference power (e.g., a first interference parameter) I1,i can be measured at the one or more devices in the first user mobile communications device group 502(1) and reported to the first radio node 402(1). In some examples, the one or more devices in the first user mobile communications device group 502(1) can measure and report a first noise parameter, such as noise power, to the first radio node 402(1). In other examples, a first signal-to-noise ratio (SNR) and/or first SINR can be reported to the first radio node 402(1). The SINR here can be defined as a received signal power (e.g., S1,i) divided by the sum of an interference power (e.g., I1,i) plus the power of background noise on the wireless channel. The SNR here can be defined as a received signal power (e.g., S1,i) divided by the power of background noise on the wireless channel.

Similarly, the second radio node 402(2) is configured to service mobile communications services between a second user mobile communications device group 502(2) to the MNO. When the second radio node 402(2) is transmitting, one or more devices in the second user mobile communications device group 502(2) receive signal power S2,j, representing received signal power from the second radio node 402(2) at a $j^{th}$ device in the second user mobile communications device group 502(2). If the first radio node 402(1) is transmitting at a same time, the one or more devices in the second user mobile communications device group 502(2) receive interference power I2,j, representing received interference power from the first radio node 402(1)

at the $j^{th}$ device in the second user mobile communications device group 502(2). The received signal power S2,j (e.g., a second signal parameter) and received interference power I2,j (e.g., a second interference parameter) can be measured at the one or more devices in the second user mobile communications device group 502(2) and reported to the second radio node 402(2). In some examples, the one or more devices in the second user mobile communications device group 502(2) can measure and report a second noise parameter, such as noise power, to the second radio node 402(2). In other examples, a second SNR and/or second SINR can be reported to the first radio node 402(1).

Once the radio node pair 400 has been identified, a throughput calculation algorithm is applied to calculate a throughput for the radio node pair 400 for setting the first radio node 402(1) and the second radio node 402(2) to each of multiple EDTs. In an exemplary aspect, a controller circuit 504(1)-504(3) coordinates selecting EDTs based on applying the throughput calculation algorithm to the radio node pair 400. The controller circuit 504(1)-504(3) can include a communication interface circuit, a processor circuit, and other components such as described below with respect to FIG. 9. In some examples, a controller circuit 504(1) is coupled to the first radio node 402(1) and the second radio node 402(2), and may comprise or be included within a central scheduler (e.g., central scheduler 322 of FIG. 3A), a services node (e.g., services node 214 of FIGS. 2-3B), or another network entity. In other examples, a first controller circuit 504(2) comprises or is included within the first radio node 402(1) and/or a second controller circuit 504(3) comprises or is included within the second radio node 402(2). Each controller circuit 504(2), 504(3) can apply a throughput calculation algorithm for the radio node pair 400, the results of which may be shared between the controller circuits 504(2), 504(3).

As a non-limiting example of the multiple EDTs, a first throughput is calculated for a first EDT (e.g., a defined high EDT), which may be based on an EDT limit (e.g., a maximum allowed EDT) under 3GPP's LAA and/or another wireless communication standard. A second throughput is calculated for a second EDT (e.g., a defined low EDT), which is less than the first EDT, and may be an EDT at which the first radio node 402(1) and the second radio node 402(2) hear each other. The second EDT may be based on a reference signal received power (RSRP) and/or a received strength signal indicator (RSSI) (e.g., RSRP and/or RSSI as defined under 3GPP's LTE or other standards) measured by the first radio node 402(1), the second radio node 402(2), one or more devices in the first user mobile communications device group 502(1), and/or one or more devices in the second user mobile communications device group 502(2). For example, the first radio node 402(1) can measure an RSRP or RSSI of the second radio node 402(2), and the second radio node 402(2) can measure an RSRP or RSSI of the first radio node 402(1). The second EDT can be based on the minimum RSRP or RSSI measurement between the first radio node 402(1) and the second radio node 402(2). For example, the second EDT can be 10 decibels (dB) below the RSRP or RSSI measured for the second radio node 402(2). In some cases, the first radio node 402(1) can identify a radio node pair 400 with more than one other radio node, and can measure an RSRP or RSSI for each of the multiple radio nodes with which it identifies a radio node pair 400. The second EDT (e.g., the defined low EDT) can be implemented based on the minimum of all the RSRP or RSSI measurements for the multiple radio nodes (e.g., 10 dB below the minimum RSRP or RSSI measurement).

In the non-limiting example of the first EDT and the second EDT, the first EDT is a higher EDT, such as an EDT based on the EDT limit under LAA, at which the first radio node 402(1) and the second radio node 402(2) may not be able to hear each other. The second EDT is a lower EDT, at which the first radio node 402(1) and the second radio node 402(2) can hear each other. Accordingly, the controller circuit 504(1)-504(3) (e.g., via a processor circuit) calculates a first throughput as a function of an SINR due to the interference when the first radio node 402(1) and the second radio node 402(2) transmit at a same time. The controller circuit 504(1)-504(3) also calculates a second throughput as a function of an SNR, as the first radio node 402(1) and the second radio node 402(2) do not transmit at a same time. The EDT which is calculated to have the higher throughput is selected for the radio node pair 400, and is generally set as the operating EDT for the first radio node 402(1) and the second radio node 402(2).

The first EDT can be calculated according to the following equation:

$$p_{\alpha_1} p_{\alpha_2} \left[ f_1\left(\frac{S_1}{I_1+N}\right) + f_2\left(\frac{S_2}{I_2+N}\right) \right] + \\ p_{\alpha_1}(1-p_{\alpha_2}) f_1\left(\frac{S_1}{N}\right) + (1-p_{\alpha_1}) p_{\alpha_2} f_2\left(\frac{S_2}{N}\right) \qquad \text{Eq. 1}$$

The second EDT can be calculated according to the following equation:

$$\gamma_1(\alpha_1, \alpha_2) f_1\left(\frac{S_1}{N}\right) + \gamma_2(\alpha_1, \alpha_2) f_2\left(\frac{S_2}{N}\right) \qquad \text{Eq. 2}$$

Under this approach, $\alpha_1$ represents the arrival rate of the first radio node 402(1), and $\alpha_2$ represents the arrival rate of the second radio node 402(2). The probability of the first radio node 402(1) transmitting is represented by $p_{\alpha_1}$ and can be derived from $\alpha_1$. The probability of the second radio node 402(2) transmitting is represented by $p_{\alpha_2}$ and can be derived from $\alpha_2$. The function $f_1$ computes the throughput for the first radio node 402(1) based on the SINR or SNR when the first radio node 402(1) operates on the respective EDT. The function $f_2$ computes the throughput for the second radio node 402(2) based on the SINR or SNR when the second radio node 402(2) operates on the respective EDT. The function $\gamma_1(\alpha_1, \alpha_2)$ computes the probability of the first radio node 402(1) transmitting based on the arrival rate $\alpha_1$ of the first radio node 402(1) and the arrival rate $\alpha_2$ of the second radio node 402(2). The function $\gamma_2(\alpha_1, \alpha_2)$ in Eq. 2 computes the probability of the second radio node 402(2) transmitting based on the arrival rate $\alpha_1$ of the first radio node 402(1) and the arrival rate $\alpha_2$ of the second radio node 402(2). The functions $\gamma_1(\alpha_1, \alpha_2)$ and $\gamma_2(\alpha_1, \alpha_2)$ can be modeled as described in Rafael Laufer and Leonard Kleinrock, "The Capacity of Wireless CSMA/CA Networks," IEEE/ACM Transactions On Networking, June 2015, which is incorporated herein by reference in its entirety.

According to Equations 1 and 2 given above, the first throughput of the radio node pair 400 operating on the first EDT (e.g., the defined high EDT) is calculated (e.g., by a processor circuit in the controller circuit 504(1)-504(3)) as a first probability of the first radio node 402(1) and the second radio node 402(2) transmitting at a same time ($p_{\alpha_1} p_{\alpha_2}$) multiplied by a first function of a first SINR (which may be based on a first signal parameter $S_1$, a first interference parameter $I_1$, and a noise parameter N, which may be a first noise parameter) when the first radio node 402(1) operates on the first EDT and a third function of a second SINR (which may be based on a second signal parameter $S_2$, a second interference parameter $I_2$, and a noise parameter N, which may be a second noise parameter) when the second radio node 402(2) operates on the first EDT $$\left(\left[f_1\left(\frac{S_1}{I_1+N}\right)+f_2\left(\frac{S_2}{I_2+N}\right)\right]\right),$$

plus a second probability of the first radio node 402(1) transmitting without the second radio node 402(2) transmitting $$p_{\alpha_1}(1-p_{\alpha_2})$$

multiplied by a forth function of the first SNR (which may be based on the first signal parameter $S_1$ and the first noise parameter N) when the first radio node 402(1) operates on the first EDT $$f_1\left(\frac{S_1}{N}\right),$$

plus a third probability of the second radio node 402(2) transmitting without the first radio node 402(1) transmitting $(1-p_{\alpha_1})p_{\alpha_2}$ multiplied by a fifth function of a second SNR (which may be based on the second signal parameter $S_2$ and the second noise parameter N) when the second radio node 402(2) operates on the first EDT $$f_2\left(\frac{S_2}{N}\right).$$

Similarly, the second throughput of the radio node pair 400 operating on the second EDT (e.g., the defined low EDT) is calculated (e.g., by a processor circuit in the controller circuit 504(1)-504(3)) as a fourth probability of the first radio node 402(1) transmitting under LBT ($\gamma_1(\alpha_1, \alpha_2)$) multiplied by a second function of the first SNR when the first radio node 402(1) operates on the second EDT $$\left(f_2\left(\frac{S_2}{N}\right)\right).$$

and a fifth probability of the second radio node 402(2) transmitting under LBT ($\gamma_2(\alpha_1, \alpha_2)$) multiplied by a sixth function of the second SNR when the second radio node 402(2) operates on the second EDT $$\left(f_1\left(\frac{S_1}{N}\right)\right)$$

In this regard, the arrival rate $\alpha_1$ of the first radio node 402(1) can be estimated based on a buffer size used by a device in the first user mobile communications device group 502(1) normalized by a total buffer size assigned from the first radio node 402(1). Similarly, the arrival rate $\alpha_2$ of the second radio node 402(2) can be estimated based on a buffer size used by a device in the second user mobile communications device group 502(2) normalized by a total buffer size assigned from the second radio node 402(2). The first signal parameter $S_1$ can be the received signal power S1,i from the first radio node 402(1) at the $i^{th}$ device in the first user mobile communications device group 502(1), which can be estimated, modeled, or otherwise based on an RSRP measured by the $i^{th}$ device. The second signal parameter $S_2$ can be the received signal power S2,j, which can be estimated, modeled, or otherwise based on an RSRP measured by the $j^{th}$ device in the second user mobile communications device group 502(2) from the second radio node 402(2). The first interference parameter $I_1$ can be the received interference power I1,i from the second radio node 402(2) at the $i^{th}$ device in the first user mobile communications device group 502(1), which can be estimated, modeled, or otherwise based on an RSRP measured by the $i^{th}$ device. The second interference parameter $I_2$ can be the received interference power I2,j, which can be estimated, modeled, or otherwise based on an RSRP measured by the $j^{th}$ device in the second user mobile communications device group 502(2) from the first radio node 402(1).

The above example of the throughput calculation algorithm has been described with respect to the first throughput for the first EDT (e.g., the defined high EDT) and the second throughput for the second EDT (e.g., the defined low EDT). It should be understood that in other examples the controller circuit 504(1)-504(3) can apply the throughput calculation algorithm to calculate additional throughputs for additional EDTs, such as another throughput for a third EDT (e.g., an EDT lower than the first EDT, which may be higher or lower than the second EDT). After the throughput calculation algorithm has been applied, the EDT with the higher throughput can be selected for the radio node pair 400.

The above examples have been described with respect to a radio node pair 400 in which both the first radio node 402(1) and the second radio node 402(2) can adjust an operating EDT. In some examples, the first radio node 402(1) can adjust its operating EDT while the second radio node 402(2) has a fixed EDT. For example, the shared spectrum can be one or more Wi-Fi channels, and the second radio node 402(2) can be a Wi-Fi device (e.g., a Wi-Fi device within the network of radio nodes or in another network). Under the Wi-Fi standard, the second radio node 402(2) has a fixed EDT of −62 decibel-milliwatts (dBm), under which the second radio node 402(2) may or may not be able to hear (e.g., sense) the first radio node 402(1) under the first EDT.

In this regard, if the second radio node 402(2) cannot hear the first radio node 402(1) when operating on the first EDT (e.g., the defined high EDT), the first EDT can be calculated as follows:

$$p_{\alpha_1}p_{\alpha_2}f_1\left(\frac{S_1}{I_1+N}\right)+p_{\alpha_1}(1-p_{\alpha_2})f_1\left(\frac{S_1}{N}\right) \qquad \text{Eq. 3}$$

If the second radio node 402(2) can hear the first radio node 402(1) when operating on the first EDT, the first EDT can be calculated according to the following equation:

$$p_{\alpha_1}f_1\left(\frac{S_1}{N}\right) \qquad \text{Eq. 4}$$

The second EDT can be calculated according to the following equation:

$$\gamma_1(\alpha_1, \alpha_2) f_1\left(\frac{S_1}{N}\right) \quad \text{Eq. 5}$$

Under this approach, the probability of the second radio node 402(2) transmitting $p_{\alpha_2}$ can be estimated, modeled, or otherwise based on a Wi-Fi medium utilization (MU) scan measured by the first radio node 402(1).

According to Equations. 3-5 given above, if the second radio node 402(2) cannot hear the first radio node 402(1) when operating on the first EDT, the first throughput of the radio node pair 400 is calculated as the first probability of the first radio node 402(1) and the second radio node 402(2) transmitting at a same time ($p_{\alpha_1} p_{\alpha_2}$) multiplied by the first function of the first SINR when the first radio node 402(1) operates on the first EDT $$\left(f_1\left(\frac{S_1}{I_1+N}\right)\right),$$

plus the second probability of the first radio node 402(1) transmitting without the second radio node 402(2) transmitting $p_{\alpha_1}(1-p_{\alpha_2})$ multiplied by the fourth function of the first SNR when the first radio node 402(1) operates on the first EDT $$f_1\left(\frac{S_1}{N}\right).$$

If the second radio node 402(2) can hear the first radio node 402(1) when operating on the first EDT, the first throughput of the radio node pair 400 is calculated as a sixth probability of the first radio node 402(1) transmitting ($p_{\alpha_1}$) multiplied by the fourth function of the first SNR when the first radio node 402(1) operates on the first EDT $$\left(f_1\left(\frac{S_1}{N}\right)\right).$$

The second throughput of the radio node pair 400 is calculated as the fourth probability of the first radio node 402(1) transmitting under LBT ($\gamma_1(\alpha_1, \alpha_2)$) multiplied by the second function of the first SNR when the first radio node 402(1) operates on the second EDT $$\left(f_1\left(\frac{S_1}{N}\right)\right).$$

In addition, while the above examples have been described with respect to a radio node pair 400 in a network of radio nodes, in some examples the radio node pair 400 can be identified between the first radio node 402(1) in a first network and the second radio node 402(2) in a second network. The first radio node 402(1) and the second radio node 402(2) can be interconnected by an X2 or similar interface, in which case the same algorithms can be applied as described above for radio nodes in the same network. The first radio node 402(1) and the second radio node 402(2) can exchange SINR or SNR parameters for the algorithm (e.g., arrival rates $\alpha_1$, $\alpha_2$, transmission probabilities $p_{\alpha_1}$, $p_{\alpha_2}$, signal parameters $S_1$, $S_2$, interference parameters $I_1$, $I_2$, and noise parameter(s) N), and/or EDT selections via the X2 interface (e.g., at common times). If the first radio node 402(1) and the second radio node 402(2) are not interconnected, the first radio node 402(1) can assume or estimate an EDT for the second radio node 402(2), and calculate throughputs according to the throughput algorithm above for the second radio node 402(2) having a fixed EDT.

It should be understood that the example depicted in FIG. 5 is described with respect to one radio node pair 400 for clarity. When the first radio node 402(1) only identifies a radio node pair 400 with the second radio node 402(2), the EDT selected for the radio node pair 400 can be set as the operating EDT of the first radio node 402(1). In some examples, the first radio node 402(1) will identify additional radio node pairs with additional radio nodes. In these examples, the first radio node 402(1) can store the EDT selected for the radio node pair 400 and the EDT selected for the additional radio node pairs, then apply a voting algorithm to select the operating EDT and maintain fairness among the radio nodes 402(1), 402(2), as further described below with respect to FIG. 6. For example, a second radio node pair can be determined between the first radio node 402(1) and a third radio node. A third throughput of the second radio node pair when operating on the first EDT can be calculated as a seventh function of a third SINR (e.g., based on a third signal parameter, a third interference parameter based on interference from the third radio node, and a noise parameter, which may be a third noise parameter) when the first radio node 402(1) operates on the first EDT. A fourth throughput of the second radio node pair when operating on the second EDT can be calculated as an eighth function of a third SNR (e.g., based on the third signal parameter and the noise parameter, which may be the third noise parameter) when the first radio node 402(1) operates on the second EDT. When the fourth throughput is higher than the third throughput, the operating EDT for the first radio node 402(1) can be set to be the second EDT (e.g., after the throughput calculation algorithm is applied to the first radio node pair 400, the EDT is only changed if the throughput calculation algorithm for the second radio node pair is a lower EDT). In other words, an example voting algorithm can set the operating EDT of the radio node in question to the selected EDT which is calculated or predicted to have a higher throughput for the network of radio nodes.

Figure 6:
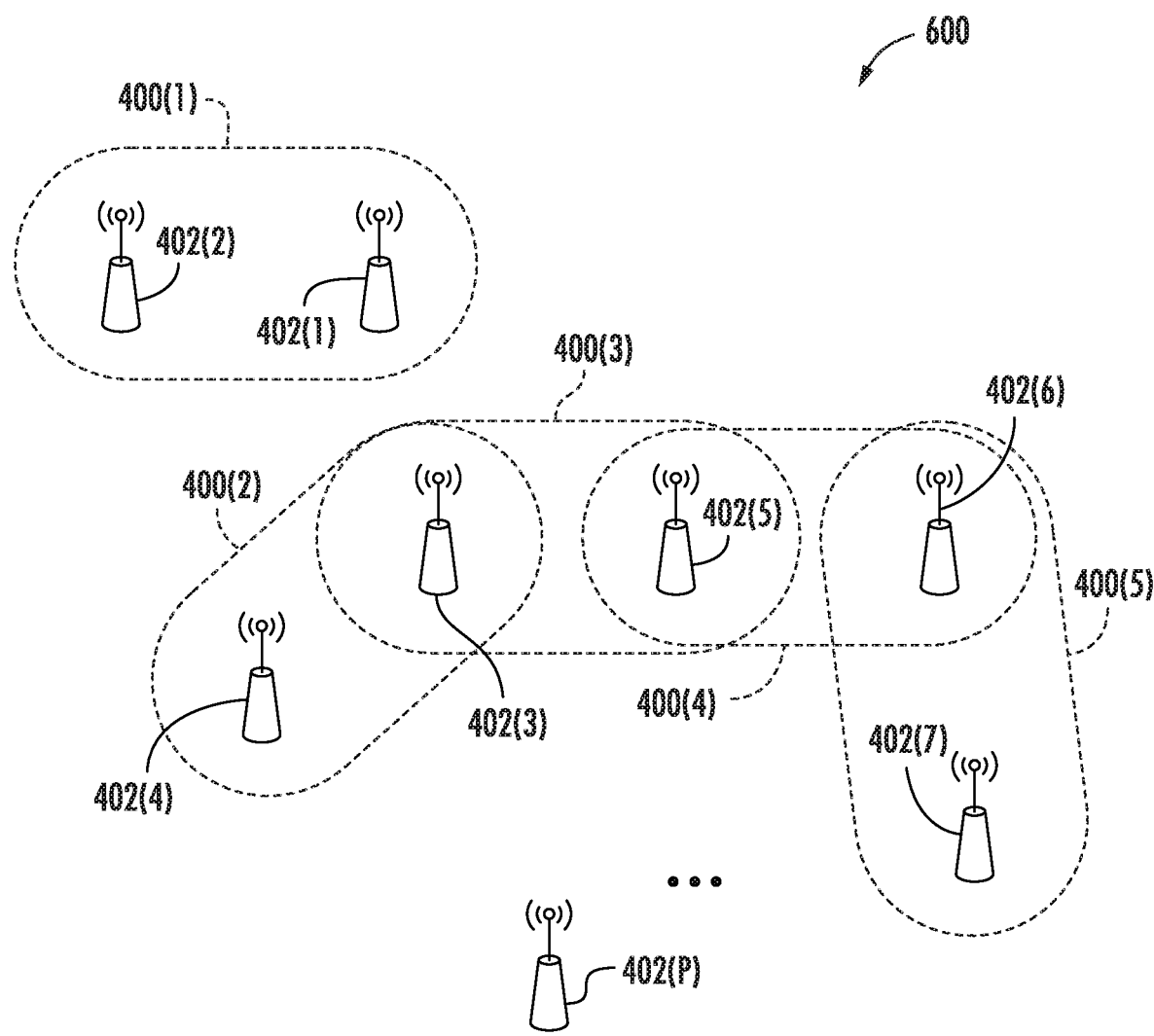
FIG. 6 is a schematic diagram of an exemplary coordinated network of radio nodes, in which radio node pairs have been identified.

In this regard, FIG. 6 is a schematic diagram of an exemplary coordinated network of radio nodes 600, such as a RAN, in which radio node pairs 400(1)-400(5) have been identified. The network of radio nodes 600 is decomposed into radio node pairs 400(1)-400(5) (e.g., by forming an "edge" between the radio nodes 402(1)-402(P) in a radio node pair 400(1)-400(5)) to facilitate applying the throughput calculation algorithm to select the operating EDT of each radio node 402(1)-402(P) to improve throughput. The radio node pairs 400(1)-400(5) can be identified (e.g., an edge can be formed) based on RSRP between neighboring radio nodes 402(1)-402(P). For example, a first radio node 402(1) in the network of radio nodes 600 can be neighbored by a second radio node 402(2), as well as a third radio node 402(3) and a fourth radio node 402(4). In other words, because the first radio node 402(1) experiences a level of radio interference from each of the second radio node 402(2), the third radio node 402(3), and the fourth radio node 402(4), these radio nodes 402(2)-402-(4) are neighboring radio nodes of the first radio node 402(1).

In this regard, the first radio node 402(1) (and/or user mobile communications devices in communication with the first radio node 402(1)) can measure an RSRP for each of the second radio node 402(2), the third radio node 402(3), and the fourth radio node 402(4). The RSRP of the second radio node 402(2) can be higher than the RSRP of the other radio nodes 402(3), 402(4) measured by the first radio node 402(1), and a first radio node pair 400(1) can be identified between the first radio node 402(1) and the second radio node 402(2) (e.g., because the second radio node 402(2) has the higher RSRP of the neighboring radio nodes 402(2)-402(4), or because only the RSRP of the second radio node exceeds a threshold). After the first radio node pair 400(1) is identified, the throughput calculation can be applied to the first radio node pair 400(1).

In another example, the third radio node 402(3) can identify a second radio node pair 400(2) with the fourth radio node 402(4), and a third radio node pair 400(3) with a fifth radio node 402(5) (e.g., because the RSRP of each of the fourth radio node 402(4) and the fifth radio node 402(5) measured or received by the third radio node 402(3) exceeds a threshold). A fourth radio node pair 400(4) can be identified with the fifth radio node 402(5) and a sixth radio node 402(6), and a fifth radio node pair 400(5) can be identified with the sixth radio node 402(6) and a seventh radio node 402(7). In another example, a $P^{th}$ radio node 402(P) may not identify radio node pairs with any other radio nodes 402(1)-402(7) (e.g., because it does not detect interference from other radio nodes 402(1)-402(7), or the RSRP from the other radio nodes 402(1)-402(7) does not exceed a threshold).

In this regard, in some examples a radio node 402(1)-402(P) will identify multiple radio node pairs 400(1)-400(5) such that more than one EDT selection may be relevant to the radio node 402(1)-402(P). For example, the third radio node 402(3) can identify the second radio node pair 400(2) with the fourth radio node 402(4) and the third radio node pair 400(3) with the fifth radio node 402(5). After identifying the radio node pairs 400(2), 400(3), the throughput calculation algorithm is applied, and an EDT is selected, for each of the second radio node pair 400(2) and the third radio node pair 400(3). The third radio node 402(3) can store the EDT selected for the second radio node pair 400(2) and the EDT selected for the third radio node pair 400(3), then apply a voting algorithm to select the operating EDT of the third radio node 402(3) and maintain fairness among the radio nodes 402(1)-402(P). In a first aspect, the voting algorithm can set the operating EDT of the third radio node 402(3) to a lower EDT (e.g., the lowest EDT) selected for the second radio node pair 400(2) and the third radio node pair 400(3). For example, if the EDT selected for the second radio node pair 400(2) is a first EDT (e.g., a defined high EDT) and the EDT selected for the third radio node pair 400(3) is a second EDT, lower than the first EDT (e.g., a defined low EDT), the operating EDT of the third radio node 402(3) is set to the second EDT.

In a second aspect, the voting algorithm can set the operating EDT of the third radio node 402(3) based on a results driven approach. For example, the voting algorithm can set the operating EDT of the third radio node 402(3) to the selected EDT of the radio node pair 400(1)-400(5) which is predicted to have a higher throughput for the third radio node 402(3) or for the network of radio nodes 600. As another example, a machine learning cost function can be defined as a function of the EDT selections of all the radio node pairs 400(1)-400(5) in the network of radio nodes 600. An exemplary cost function can perform a regression between a measured throughput R and estimated throughput calculation function $\hat{R}$ as in Equation 2 above, adding scalers $\beta_1$ and $\beta_2$ as follows:

$$\hat{R} = (\gamma_1(\alpha_1, \alpha_2) + \beta_1) f_1\left(\frac{S_1}{N}\right) + (\gamma_2(\alpha_1, \alpha_2) + \beta_2) f_2\left(\frac{S_2}{N}\right) \qquad \text{Eq. 6}$$

In the exemplary cost function, a mean square equation between R and $\hat{R}$ is minimized as indicated below:

$$|\hat{R}-R|^2 \qquad \text{Eq. 7}$$

In this regard, the voting algorithm can also apply a weighted majority voting under the cost function, and the operating EDT of the third radio node 402(3) is set to the result of the weighted majority voting.

In an exemplary aspect of the disclosure, the throughput calculation algorithm and selection of EDTs for the radio node pairs 400(1)-400(5), as well as the application of voting algorithms, is performed dynamically. In a first example, the network of radio nodes 600 and/or the radio node pairs 400(1)-400(5) can periodically (e.g., after one or more minutes) select (e.g., optimize) the operating EDTs of the radio nodes 402(1)-402(P). In another example, the operating EDTs of the radio nodes 402(1)-402(P) can be selected or optimized after the occurrence of an event, such as a change in measured throughput above or below a threshold, an increase or decrease in SINR, and so on. Generally, the radio node pairs 400(1)-400(5) can remain constant through multiple applications of the throughput calculation algorithm and EDT selections, but in some cases radio node pairs 400(1)-400(5) can also be determined from time to time or along with the EDT selections.

Figure 7:
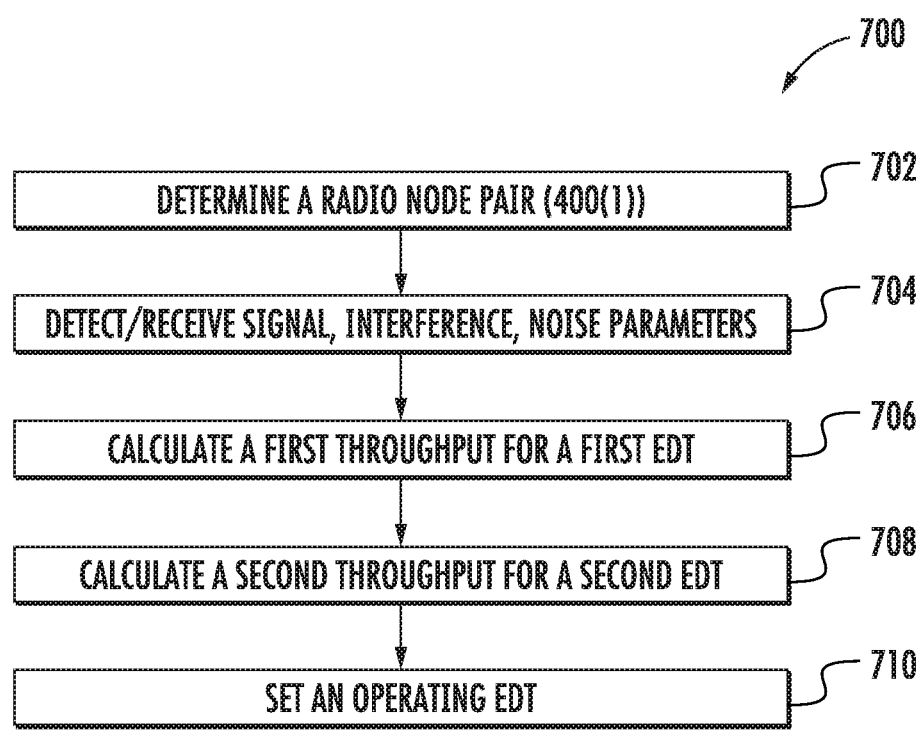
FIG. 7 is a flowchart illustrating an exemplary process of selecting an EDT for a first radio node deploying listen before talk.

FIG. 7 is a flowchart illustrating an exemplary process of selecting an EDT for a first radio node 402(1) deploying listen before talk. The process 700 comprises determining a radio node pair 400(1) (block 702), which can include identifying a radio node pair 400(1) (e.g., forming an "edge") between the first radio node 402(1) and a second radio node 402(2) based on RSRP measured by the first radio node 402(1) or a user mobile communications device in communication with the first radio node 402(1). The process 700 also comprises detecting (e.g., measuring) or receiving a first signal parameter, a first interference parameter, and a first noise parameter (block 704). The process 700 also comprises calculating a first throughput for the first radio node 402(1) operating on a first EDT (block 706) as a first function of a first SINR based on the first signal parameter, the first interference parameter, and the first noise parameter. The process 700 also comprises calculating a second throughput for the first radio node 402(1) operating on a second EDT (block 708) as a second function of a first SNR based on the first signal parameter and the first noise parameter, which can be based on the throughput algorithms described above with respect to FIG. 5. The process 700 also comprises setting an operating EDT for the radio node pair 400(1) based on the throughput calculations (block 710). For example, when the first throughput is higher than the second throughput, the operating EDT for the first radio node 402(1) can be set to be the first EDT. When the second throughput is higher than the first throughput, the operating EDT for the first radio node 402(1) can be set to be the second EDT.

Figure 8:
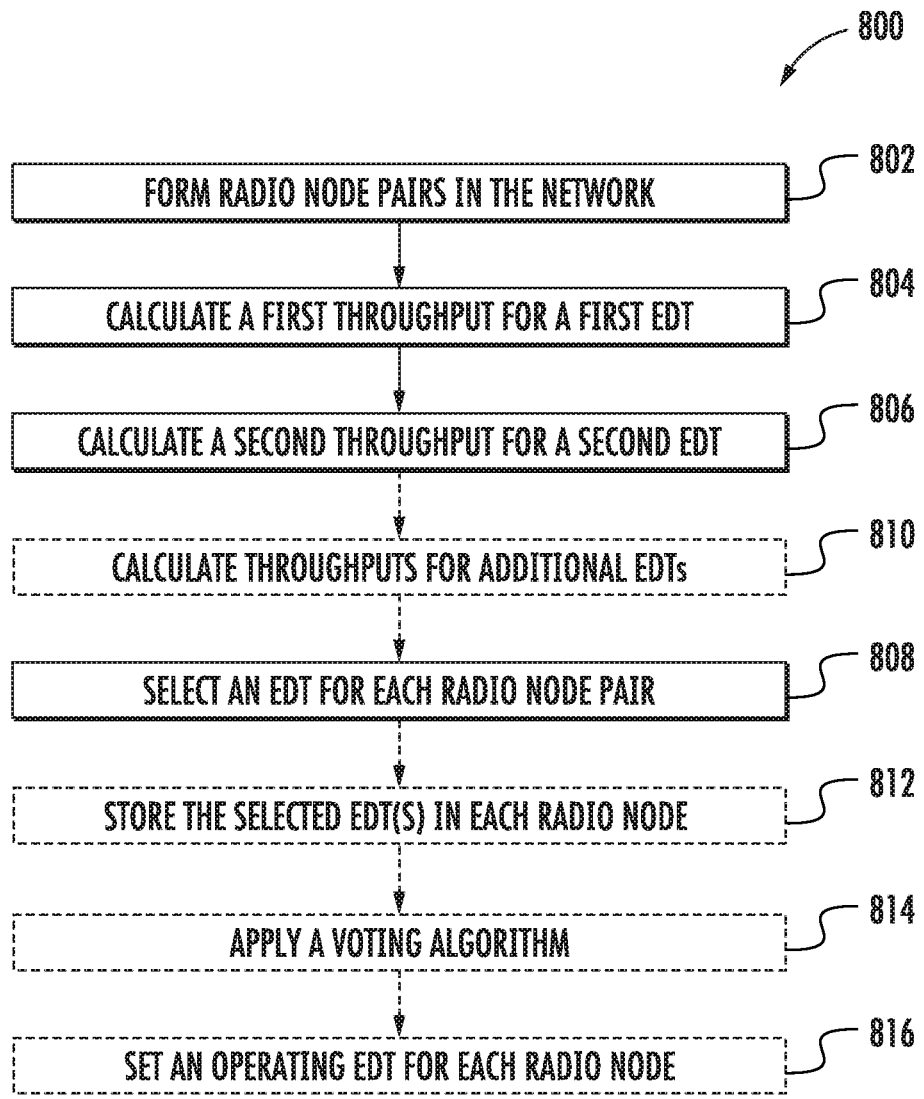
FIG. 8 is a flowchart illustrating an exemplary process of selecting EDTs in a network of radio nodes deploying listen before talk.

FIG. 8 is a flowchart illustrating an exemplary process of selecting EDTs in a network of radio nodes deploying listen before talk. The process 800 comprises identifying at least one of a plurality of radio node pairs 400(1)-400(5) in the network (block 802) (e.g., forming an "edge" between a respective first radio node 402(1) and a respective second radio node 402(P) in a radio node pair 400(1)), which can include identifying the radio node pairs 400(1)-400(5) based on RSRP measured between neighboring radio nodes 402(1)-402(P), as described above with respect to FIG. 6. The process 800 also comprises, for each of the identified radio node pairs 400(1)-400(5), calculating a first throughput for a respective radio node pair 400(1)-400(5) operating on a first EDT (block 804), which can be calculated as a function of an SINR. The process 800 also comprises calculating for each of the identified radio node pairs 400(1)-400(5), a second throughput for the respective radio node pair 400(1)-400(5) operating on a second EDT (block 806), which is lower than the first EDT, as a function of an SNR, such as described above with respect to FIG. 5. The process 800 also comprises selecting an EDT for each radio node pair 400(1)-400(5) based on the throughput calculations (block 808). For example, when the first throughput is higher than the second throughput, the first EDT can be selected for the respective radio node pair 400(1)-400(5). When the second throughput is higher than the first throughput, the second EDT can be selected for the respective radio node pair 400(1)-400(5).

In some cases, the exemplary process 800 can include additional operations. For example, the process 800 can also comprise calculating throughputs for additional EDTs (block 810). After the EDT for each radio node pair 400(1)-400(5) is selected (block 808), one or more selected EDTs can be stored in each radio node 402(1)-402(P) (block 812). When multiple EDTs are selected for a radio node 402(1)-402(P), a voting algorithm is applied to the radio node 402(1)-402(P) (block 814), such as described above with respect to FIG. 6. The process 800 can also comprise setting an operating EDT for each radio node 402(1)-402(P) (block 816).

Figure 9:
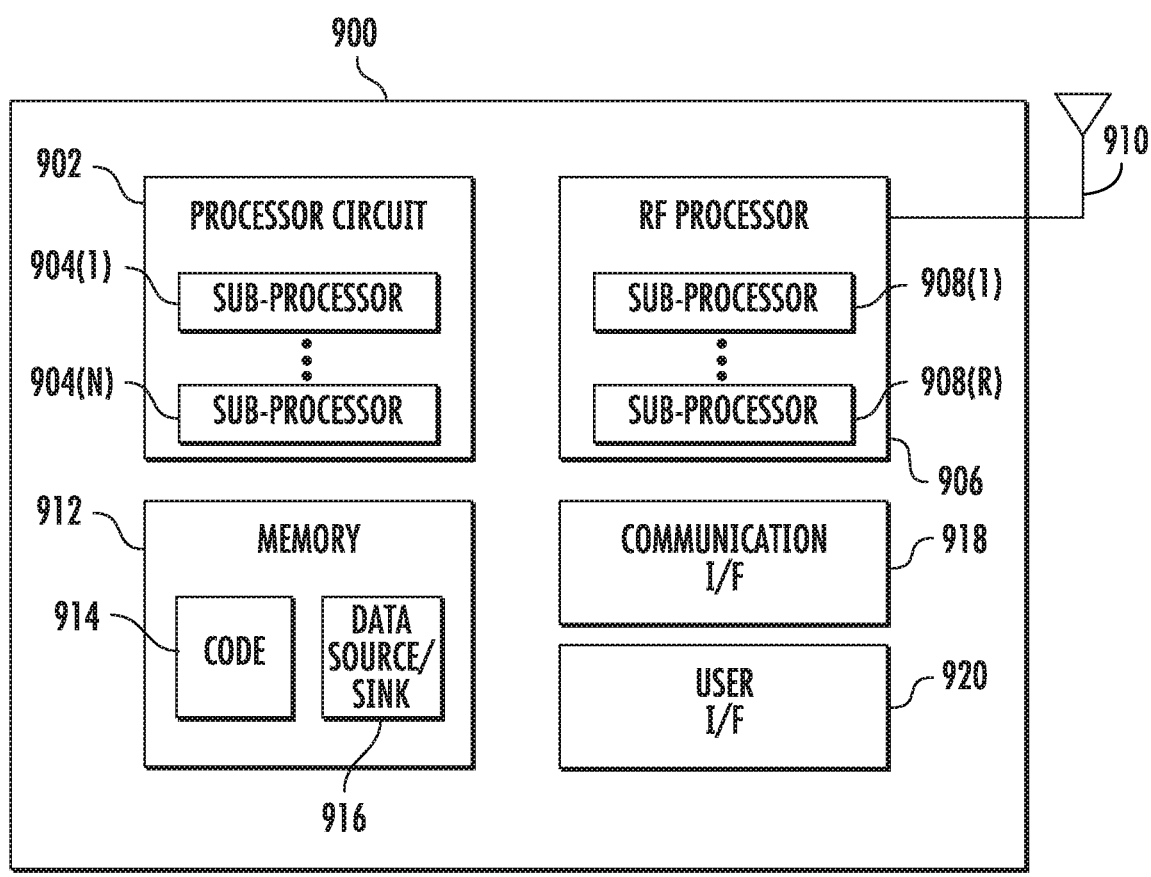
FIG. 9 is a schematic diagram of an exemplary computer system that can be implemented for a radio node, a central scheduler, a services node, or another network entity that may facilitate dynamically selecting EDTs in radio nodes within a network to improve throughput.

FIG. 9 shows a simplified functional block diagram 900 of an illustrative computer system for a controller circuit 504(1)-504(3), which can comprise or be included in a radio node 402(1)-402(P), a central scheduler 322, a services node 214 and/or another network entity that may facilitate dynamically selecting EDTs in radio nodes 402(1)-402(P) within a network of radio nodes 600 to improve throughput. A processor circuit 902 typically handles high level processing. The processor circuit 902 may include one or more sub-processors 904(1)-904(N) or cores that are configured to handle specific tasks or functions. An RF processor 906 implements various signal processing functions for radio frequency communications, including uplink and downlink signal processing. The RF processor 906 may include one or more sub-processors 908(1)-908(R) or cores that are configured to handle specific tasks or functions. The RF processor 906 is generally coupled to an RF antenna 910 for transmitting and receiving RF signals. A memory 912 is a computer-readable medium that stores computer-readable code 914 that is executable by one or more processors including the processor circuit 902 and/or the RF processor 906. The memory 912 may also include various data sources and data sinks (collectively represented by element 916) that may provide additional functionalities.

The hardware infrastructure may also include various interfaces (I/Fs) including a communication I/F circuit 918, which may be used, for example, to send and/or receive communications from one or more radio nodes 402(1)-402(P) and/or otherwise implement a link between the services node 214 (of FIG. 2), LAN, a RAN and/or radio node 402(1)-402(P) (e.g., via an X2 interface), or to an external processor, control, or data source. The code 914 in typical deployments is arranged to be executed by the processor circuit 902 and/or the RF processor 906 and/or the communication I/F circuit 918 to facilitate coordination between radio nodes 402(1)-402(P) in a radio node pair 400(1)-400(5) to dynamically select and/or adjust EDTs to improve throughput. The code 914 additionally applies the throughput calculation algorithm described above with respect to FIGS. 5-8. In some cases, a user I/F circuit 920 may be utilized to provide various indications such as power status or to enable some local control of features or settings. More particularly, the RF processor 906 may be eliminated in some applications and any functionality that it provides that is needed to implement the services node 214 may be provided by the processor circuit 902.

While the computer-readable medium is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred. It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method of selecting energy detection thresholds (EDTs) in a network of radio nodes deploying listen before talk, comprising:
   identifying at least one of a plurality of radio node pairs in the network of radio nodes; and
   for each of the identified at least one of the plurality of radio node pairs:
      calculating a first throughput for a respective radio node pair operating on a first EDT as a function of a signal-to-interference-plus noise ratio (SINR);
      calculating a second throughput for the respective radio node pair operating on a second EDT, lower than the first EDT, as a function of a signal-to-noise ratio (SNR);
      selecting an EDT for the respective radio node pair to be the first EDT when the first throughput is higher than the second throughput; and
      selecting the EDT for the respective radio node pair to be the second EDT when the second throughput is higher than the first throughput,
      wherein the identifying at least one of the plurality of radio node pairs comprises, for each radio node in the network of radio nodes, identifying a radio node pair with a neighboring radio node having a higher reference signal received power (RSRP).

2. A method of selecting energy detection thresholds (EDTs) in a network of radio nodes deploying listen before talk, comprising:
   identifying at least one of a plurality of radio node pairs in the network of radio nodes; and
   for each of the identified at least one of the plurality of radio node pairs:
      calculating a first throughput for a respective radio node pair operating on a first EDT as a function of a signal-to-interference-plus noise ratio (SINR);

calculating a second throughput for the respective radio node pair operating on a second EDT, lower than the first EDT, as a function of a signal-to-noise ratio (SNR);
selecting an EDT for the respective radio node pair to be the first EDT when the first throughput is higher than the second throughput; and
selecting the EDT for the respective radio node pair to be the second EDT when the second throughput is higher than the first throughput,
wherein the identifying at least one of the plurality of radio node pairs comprises, for each radio node in the network of radio nodes, identifying a radio node pair with a neighboring radio node based on a higher reference signal received power (RSRP) among a plurality of RSRPs detected by a user mobile communications device in communication with the radio node.

3. A method of selecting energy detection thresholds (EDTs) in a network of radio nodes deploying listen before talk, comprising:
identifying at least one of a plurality of radio node pairs in the network of radio nodes;
for each of the identified at least one of the plurality of radio node pairs:
calculating a first throughput for a respective radio node pair operating on a first EDT as a function of a signal-to-interference-plus noise ratio (SINR);
calculating a second throughput for the respective radio node pair operating on a second EDT, lower than the first EDT, as a function of a signal-to-noise ratio (SNR);
selecting an EDT for the respective radio node pair to be the first EDT when the first throughput is higher than the second throughput;
selecting the EDT for the respective radio node pair to be the second EDT when the second throughput is higher than the first throughput; and
setting an operating EDT of a first radio node in the network of radio nodes based on the selected EDT for a respective radio node pair which includes with the first radio node; and applying a voting algorithm to set the operating EDT of the first radio node where the first radio node is included in more than one radio node pair.

4. The method of claim 3, wherein the voting algorithm comprises setting the operating EDT to a lower selected EDT of the more than one radio node pair including the first radio node.

5. The method of claim 3, wherein the voting algorithm comprises setting the operating EDT to the selected EDT of the more than one radio node pair predicted to have a higher throughput for the network of radio nodes.

6. A method of selecting energy detection thresholds (EDTs) in a network of radio nodes deploying listen before talk, comprising:
identifying at least one of a plurality of radio node pairs in the network of radio nodes; and
for each of the identified at least one of the plurality of radio node pairs:
calculating a first throughput for a respective radio node pair operating on a first EDT as a function of a signal-to-interference-plus noise ratio (SINR);
calculating a second throughput for the respective radio node pair operating on a second EDT, lower than the first EDT, as a function of a signal-to-noise ratio (SNR);
selecting an EDT for the respective radio node pair to be the first EDT when the first throughput is higher than the second throughput; and
selecting the EDT for the respective radio node pair to be the second EDT when the second throughput is higher than the first throughput,
wherein the first EDT is based on an EDT limit according to the Third Generation Partnership Project (3GPP) specification.

7. A method of selecting energy detection thresholds (EDTs) in a network of radio nodes deploying listen before talk, comprising:
identifying at least one of a plurality of radio node pairs in the network of radio nodes; and
for each of the identified at least one of the plurality of radio node pairs:
calculating a first throughput for a respective radio node pair operating on a first EDT as a function of a signal-to-interference-plus noise ratio (SINR);
calculating a second throughput for the respective radio node pair operating on a second EDT, lower than the first EDT, as a function of a signal-to-noise ratio (SNR);
selecting an EDT for the respective radio node pair to be the first EDT when the first throughput is higher than the second throughput; and
selecting the EDT for the respective radio node pair to be the second EDT when the second throughput is higher than the first throughput,
wherein the second EDT is based on a reference signal received power (RSRP) associated with the respective radio node pair.

8. The method of claim 7, further comprising setting an operating EDT of a first radio node in the network of radio nodes to be ten (10) dB below the RSRP associated with the respective radio node pair when the second throughput is higher than the first throughput.

9. A method of selecting energy detection thresholds (EDTs) in a network of radio nodes deploying listen before talk, comprising:
identifying at least one of a plurality of radio node pairs in the network of radio nodes; and
for each of the identified at least one of the plurality of radio node pairs:
calculating a first throughput for a respective radio node pair operating on a first EDT as a function of a signal-to-interference-plus noise ratio (SINR);
calculating a second throughput for the respective radio node pair operating on a second EDT, lower than the first EDT, as a function of a signal-to-noise ratio (SNR);
selecting an EDT for the respective radio node pair to be the first EDT when the first throughput is higher than the second throughput;
selecting the EDT for the respective radio node pair to be the second EDT when the second throughput is higher than the first throughput; and
for each of the plurality of radio node pairs:
calculating a third throughput for the respective radio node pair operating on a third EDT, lower than the first EDT and higher than the second EDT, as a function of SINR; and
selecting the EDT for the respective radio node pair to be the third EDT when the third throughput is higher than the first throughput and the second throughput.

10. A method of selecting an energy detection threshold (EDT) for a first radio node deploying listen before talk, comprising:
   determining a first radio node pair between the first radio node and a second radio node;
   detecting a first signal parameter, a first interference parameter, and a first noise parameter associated with the first radio node;
   calculating a first throughput for the first radio node operating on a first EDT as a first function of a first signal-to-interference-plus noise ratio (SINR) based on the first signal parameter, the first interference parameter, and the first noise parameter;
   calculating a second throughput for the first radio node operating on a second EDT, lower than the first EDT, as a second function of a first signal-to-noise ratio (SNR) based on the first signal parameter and the first noise parameter;
   setting an operating EDT for the first radio node to be the first EDT when the first throughput is higher than the second throughput;
   setting the operating EDT for the first radio node to be the second EDT when the second throughput is higher than the first throughput;
   receiving a second signal parameter, a second interference parameter, and a second noise parameter associated with the second radio node; and
   calculating the first throughput for the first radio node operating on the first EDT as the first function of the first SINR and a third function of a second SINR based on the second signal parameter, the second interference parameter, and the second noise parameter.

11. The method of claim 10, wherein the first throughput is calculated as:
   a first probability of the first radio node and the second radio node transmitting at a same time multiplied by the first function of the first SINR and the third function of the second SINR;
   a second probability of the first radio node transmitting without the second radio node transmitting multiplied by a fourth function of the first SNR; and
   a third probability of the second radio node transmitting without the first radio node transmitting multiplied by a fifth function of a second SNR based on the second signal parameter and the second noise parameter.

12. The method of claim 10, further comprising calculating the second throughput for the second EDT as the second function of the first SNR and a sixth function of a second SNR based on the second signal parameter and the second noise parameter.

13. The method of claim 12, wherein the second throughput is calculated as:
   a fourth probability of the first radio node transmitting multiplied by the second function of the first SNR; and
   a fifth probability of the second radio node transmitting multiplied by the sixth function of the second SNR.

14. The method of claim 10, wherein the first interference parameter is based on a power of an interfering signal received from the second radio node by the first radio node or by a user mobile communications device in communication with the first radio node.

15. The method of claim 10, wherein:
   the second radio node is a Wi-Fi device; and
   the method further comprises determining whether the second node can sense the first node based on a received strength signal indicator (RSSI);
   when the second node is determined not to sense the first node, the first throughput is calculated as:
      a first probability of the first radio node and the second radio node transmitting at a same time multiplied by the first function of the first SINR; and
      a second probability of the first radio node transmitting without the second radio node transmitting multiplied by a fourth function of the first SNR; and
   when the second node is determined to sense the first node, the first throughput is calculated as a sixth probability of the first radio node transmitting multiplied by the fourth function of the first SNR.

16. A method of selecting an energy detection threshold (EDT) for a first radio node deploying listen before talk, comprising:
   determining a first radio node pair between the first radio node and a second radio node;
   detecting a first signal parameter, a first interference parameter, and a first noise parameter associated with the first radio node;
   calculating a first throughput for the first radio node operating on a first EDT as a first function of a first signal-to-interference-plus noise ratio (SINR) based on the first signal parameter, the first interference parameter, and the first noise parameter;
   calculating a second throughput for the first radio node operating on a second EDT, lower than the first EDT, as a second function of a first signal-to-noise ratio (SNR) based on the first signal parameter and the first noise parameter;
   setting an operating EDT for the first radio node to be the first EDT when the first throughput is higher than the second throughput; and
   setting the operating EDT for the first radio node to be the second EDT when the second throughput is higher than the first throughput,
   wherein the determining the first radio node pair comprises:
      determining a reference signal received power (RSRP) for each radio node neighboring the first radio node; and
      selecting the second radio node from the neighboring radio node with a higher RSRP.

17. The method of claim 16, wherein:
   the first EDT is based on an EDT limit according to the Third Generation Partnership Project (3GPP) specification; and
   the second EDT is based on the RSRP for the second radio node.

18. A method of selecting an energy detection threshold (EDT) for a first radio node deploying listen before talk, comprising:
   determining a first radio node pair between the first radio node and a second radio node;
   detecting a first signal parameter, a first interference parameter, and a first noise parameter associated with the first radio node;
   calculating a first throughput for the first radio node operating on a first EDT as a first function of a first signal-to-interference-plus noise ratio (SINR) based on the first signal parameter, the first interference parameter, and the first noise parameter;
   calculating a second throughput for the first radio node operating on a second EDT, lower than the first EDT, as a second function of a first signal-to-noise ratio (SNR) based on the first signal parameter and the first noise parameter;

setting an operating EDT for the first radio node to be the first EDT when the first throughput is higher than the second throughput;

setting the operating EDT for the first radio node to be the second EDT when the second throughput is higher than the first throughput;

determining a second radio node pair between the first radio node and a third radio node;

detecting a third signal parameter, a third interference parameter, and a third noise parameter associated with the first radio node, the third interference parameter based on interference from the third radio node;

calculating a third throughput for the second radio node pair operating on the first EDT as a seventh function of a third SINR based on the third signal parameter, the third interference parameter, and the third noise parameter;

calculating a fourth throughput for the second radio node pair operating on the second EDT as an eighth function of a third SNR based on the third signal parameter and the third noise parameter; and setting the operating EDT for the first radio node to be the second EDT when the fourth throughput is higher than the third throughput.

19. A method of selecting an energy detection threshold (EDT) for a first radio node deploying listen before talk, comprising:

determining a first radio node pair between the first radio node and a second radio node;

detecting a first signal parameter, a first interference parameter, and a first noise parameter associated with the first radio node;

calculating a first throughput for the first radio node operating on a first EDT as a first function of a first signal-to-interference-plus noise ratio (SINR) based on the first signal parameter, the first interference parameter, and the first noise parameter;

calculating a second throughput for the first radio node operating on a second EDT, lower than the first EDT, as a second function of a first signal-to-noise ratio (SNR) based on the first signal parameter and the first noise parameter;

setting an operating EDT for the first radio node to be the first EDT when the first throughput is higher than the second throughput;

setting the operating EDT for the first radio node to be the second EDT when the second throughput is higher than the first throughput; and transmitting an indication of the operating EDT to the second radio node over an X2 interface.

* * * * *

UNITED STATES PATENT AND TRADEMARK OFFICE
CERTIFICATE OF CORRECTION

| | | |
|---|---|---|
| PATENT NO. | : 10,785,800 B2 | Page 1 of 1 |
| APPLICATION NO. | : 16/201173 | |
| DATED | : September 22, 2020 | |
| INVENTOR(S) | : Chen et al. | |

It is certified that error appears in the above-identified patent and that said Letters Patent is hereby corrected as shown below:

In the Specification

On Column 23, Line 16, delete "distributed antenna"

Signed and Sealed this
Twentieth Day of September, 2022

Katherine Kelly Vidal
*Director of the United States Patent and Trademark Office*